United States Patent
Kohara et al.

(10) Patent No.: US 10,095,413 B2
(45) Date of Patent: Oct. 9, 2018

(54) MEMORY SYSTEM WITH ADDRESS TRANSLATION BETWEEN A LOGICAL ADDRESS AND A PHYSICAL ADDRESS

(71) Applicant: Toshiba Memory Corporation, Minato-ku (JP)

(72) Inventors: Shunitsu Kohara, Yokohama (JP); Kazuya Kitsunai, Fujisawa (JP); Satoshi Arai, Yokohama (JP); Yoshihisa Kojima, Kawasaki (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 123 days.

(21) Appl. No.: 15/208,725

(22) Filed: Jul. 13, 2016

(65) Prior Publication Data

US 2017/0220253 A1    Aug. 3, 2017

Related U.S. Application Data

(60) Provisional application No. 62/287,998, filed on Jan. 28, 2016.

(51) Int. Cl.
    *G06F 3/06*    (2006.01)
    *G06F 12/02*   (2006.01)

(52) U.S. Cl.
    CPC ........... *G06F 3/061* (2013.01); *G06F 3/0655* (2013.01); *G06F 3/0688* (2013.01); *G06F 12/0246* (2013.01); *G06F 2212/7201* (2013.01)

(58) Field of Classification Search
    CPC .................................................. G06F 12/04
    See application file for complete search history.

(56) References Cited

U.S. PATENT DOCUMENTS

| | | | |
|---|---|---|---|
| 6,453,383 B1 * | 9/2002 | Stoddard | G06F 3/0607 707/999.202 |
| 7,814,262 B2 | 10/2010 | Sinclair | |
| 8,554,994 B2 | 10/2013 | Resch | |
| 2007/0038802 A1 * | 2/2007 | Tsai | G06F 12/0246 711/103 |

(Continued)

OTHER PUBLICATIONS

Park et al. "A Workload-Aware Adaptive Hybrid Flash Translation Layer with an Efficient Caching Strategy." Jul. 2011. IEEE. Mascots 2011. pp. 248-255.*

(Continued)

*Primary Examiner* — Nathan Sadler
(74) *Attorney, Agent, or Firm* — Oblon, McClelland, Maier & Neustadt, L.L.P.

(57) ABSTRACT

According to one embodiment, a memory system which is connectable to a host, the memory system includes a first memory as a nonvolatile memory storing information associated with an address translation between a logical address and a physical address, a second memory temporarily storing a part of the information at least, a first controller executing a read operation and a write operation of the information for the second memory in a first data unit, the first data unit being changeable and being a data size of one of regions obtained by dividing in a first address space, the part of the information at least stored in the first memory, and a second controller executing a read operation and a write operation of the information for the first memory in a second data unit different from the first data unit.

19 Claims, 15 Drawing Sheets

(56) References Cited

U.S. PATENT DOCUMENTS

| | | | | |
|---|---|---|---|---|
| 2008/0109630 | A1* | 5/2008 | Watanabe | G06F 3/0608 711/171 |
| 2008/0183950 | A1* | 7/2008 | Roohparvar | G06F 12/0246 711/103 |
| 2009/0196102 | A1* | 8/2009 | Kim | G11C 7/1045 365/185.11 |
| 2010/0100667 | A1* | 4/2010 | Kang | G06F 12/0246 711/103 |
| 2012/0033497 | A1* | 2/2012 | Kim | G11C 8/08 365/185.11 |
| 2012/0179853 | A1* | 7/2012 | Manning | G06F 12/0246 711/3 |
| 2012/0260038 | A1* | 10/2012 | Imazaki | G06F 3/0608 711/114 |
| 2013/0191601 | A1 | 7/2013 | Peterson et al. | |
| 2014/0082323 | A1* | 3/2014 | Li | G06F 12/0246 711/207 |
| 2014/0129760 | A1* | 5/2014 | Lee | G06F 12/0246 711/103 |
| 2014/0208003 | A1* | 7/2014 | Cohen | G11C 16/08 711/103 |
| 2014/0208061 | A1* | 7/2014 | Cohen | G06F 12/0246 711/206 |
| 2014/0223089 | A1* | 8/2014 | Kang | G06F 12/0246 711/103 |
| 2017/0192903 | A1* | 7/2017 | Kawamura | G06F 12/10 |

OTHER PUBLICATIONS

Lee et al. "μ-FTL: A Memory-Efficient Flash Translation Layer Supporting Multiple Mapping Granularities." Oct. 2008. ACM. EMSOFT'08. pp. 21-30.*

Wu et al. "An Adaptive Flash Translation Layer for High-Performance Storage Systems." IEEE. IEEE Ttransactions on Computer-Aided Design of Integrated Circuits and Systems. vol. 29. pp. 953-965.*

* cited by examiner

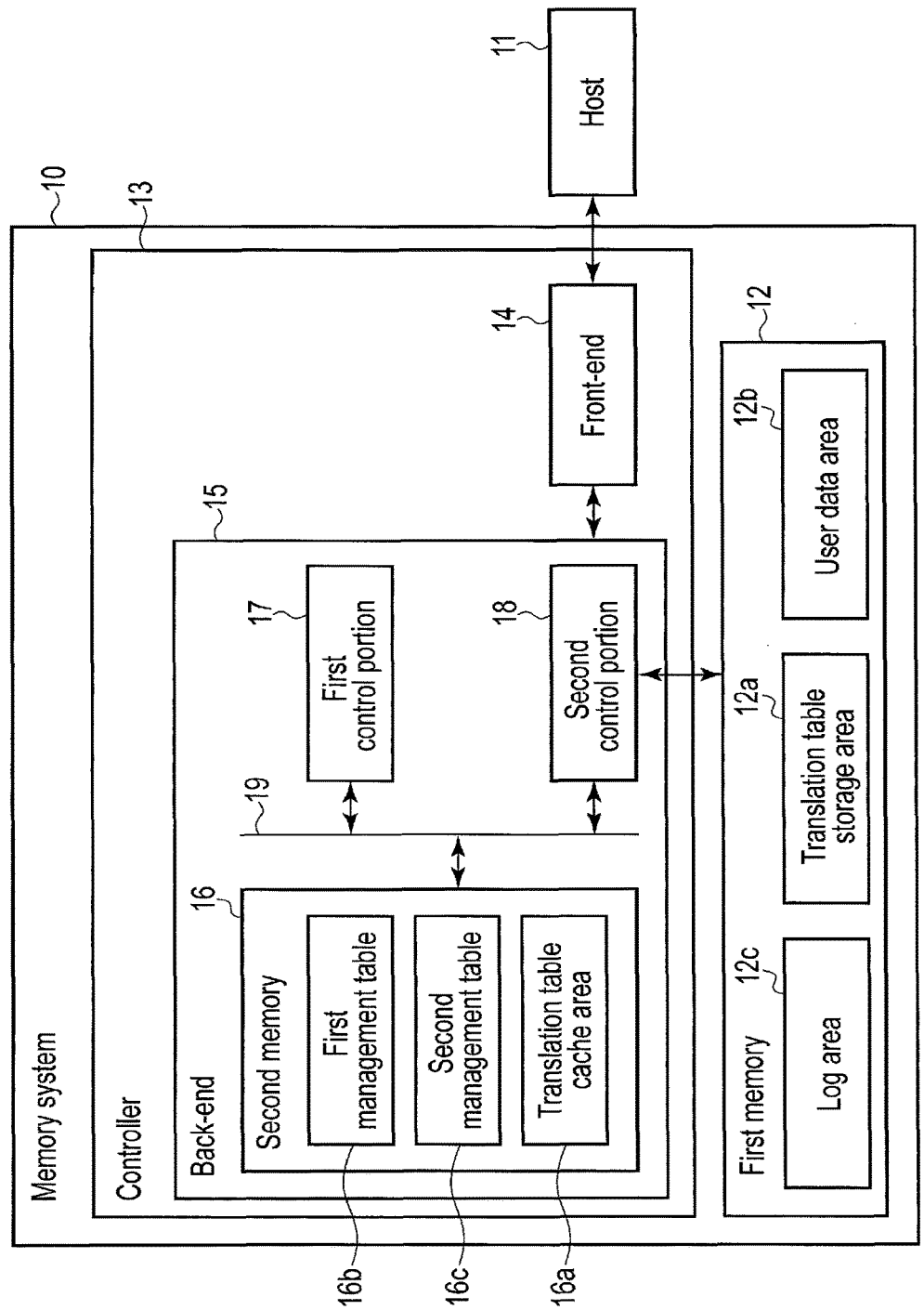
F I G. 1

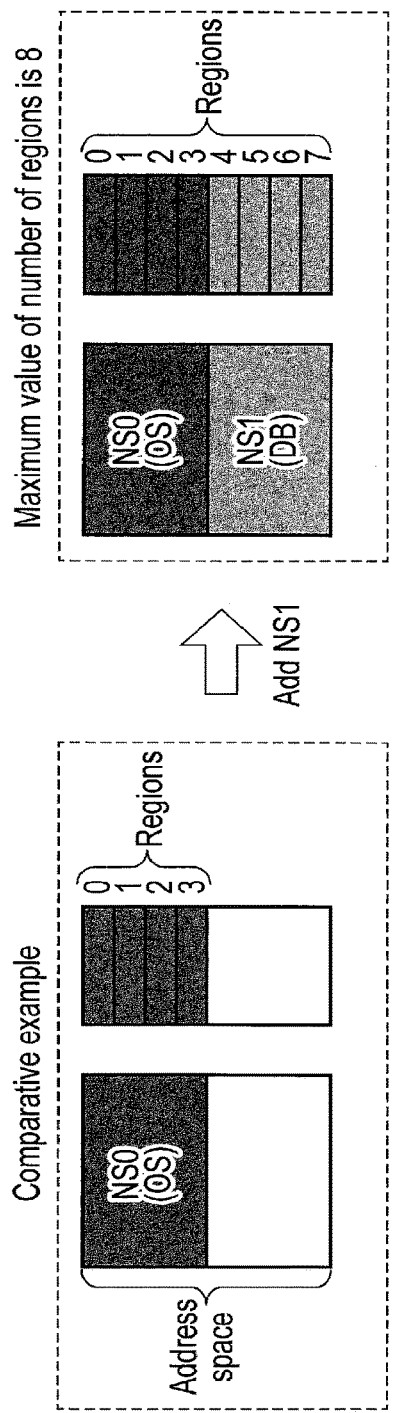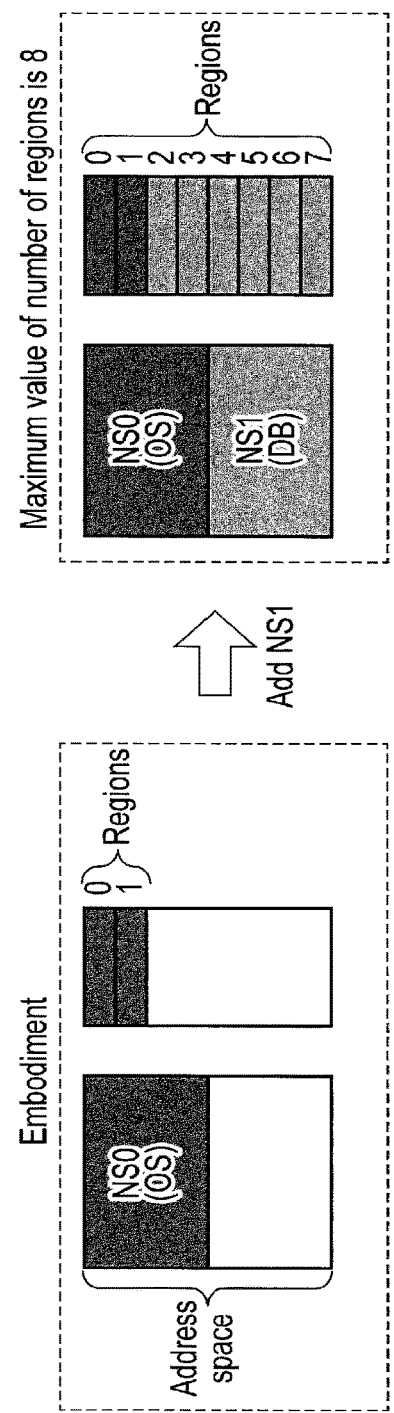
F I G. 2A
F I G. 2B

| Cluster size 4096 byte ||||
| Region size(byte) | Number of regions | Region entry size(byte) | Number of regions entry |
| --- | --- | --- | --- |
| 4 | 1024 | 4 | 1 |
| 8 | 512 | 4 | 2 |
| 16 | 256 | 4 | 4 |
| 32 | 128 | 4 | 8 |
| 64 | 64 | 4 | 16 |
| 128 | 32 | 4 | 32 |
| 256 | 16 | 4 | 64 |
| 512 | 8 | 4 | 128 |
| 1024 | 4 | 4 | 256 |
| 2048 | 2 | 4 | 512 |
| 4096 | 1 | 4 | 1024 |

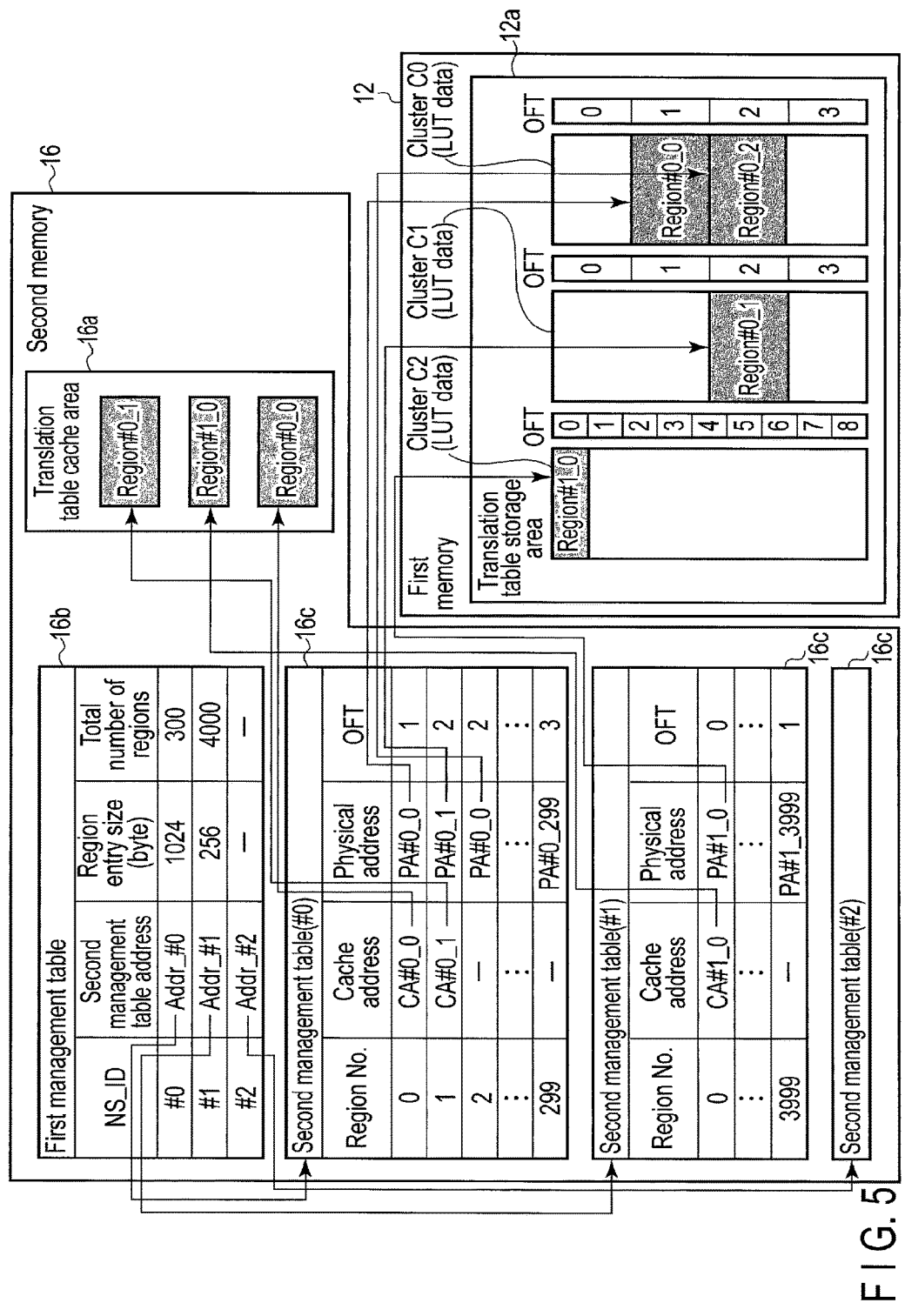
F I G. 5

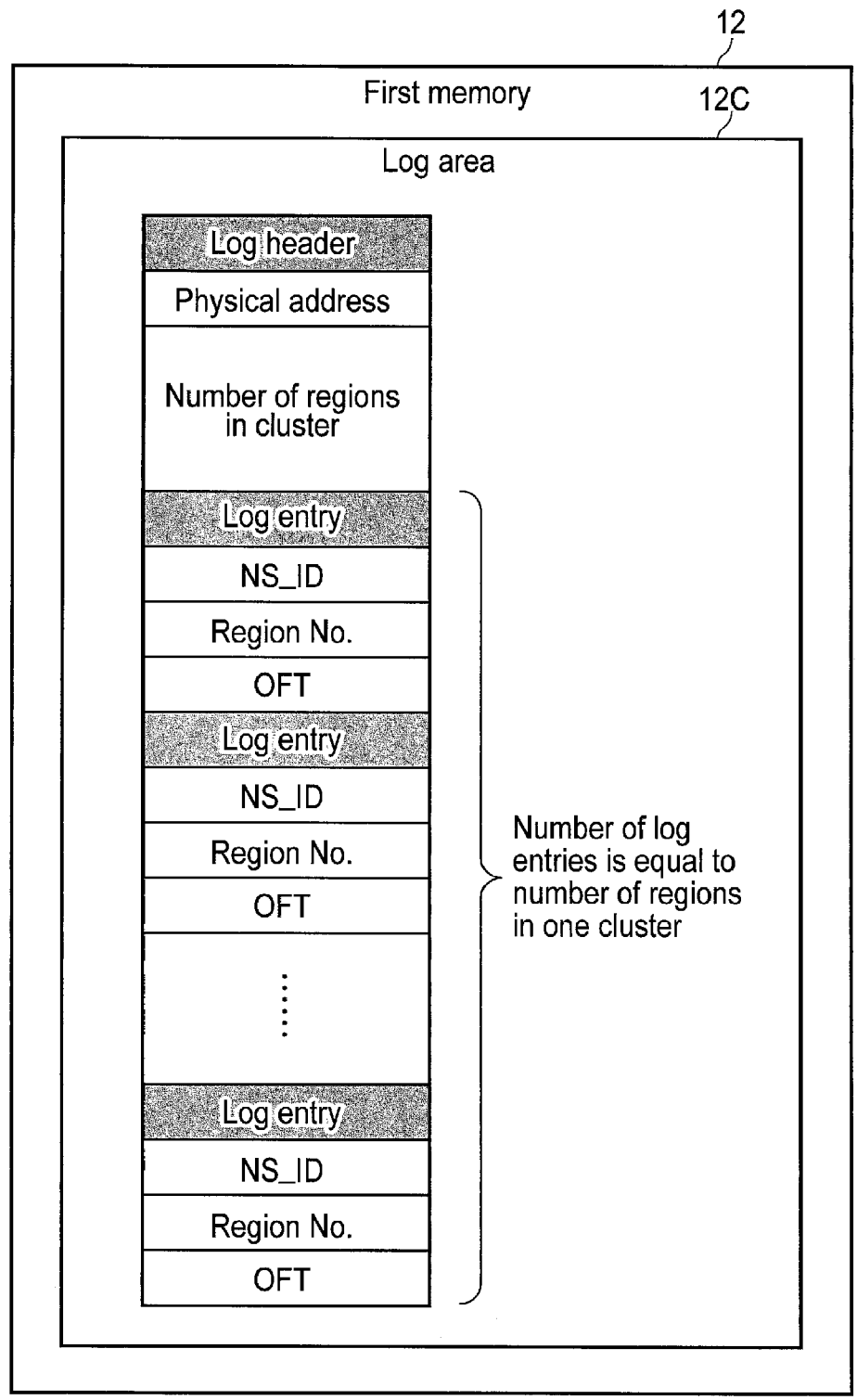
F I G. 6

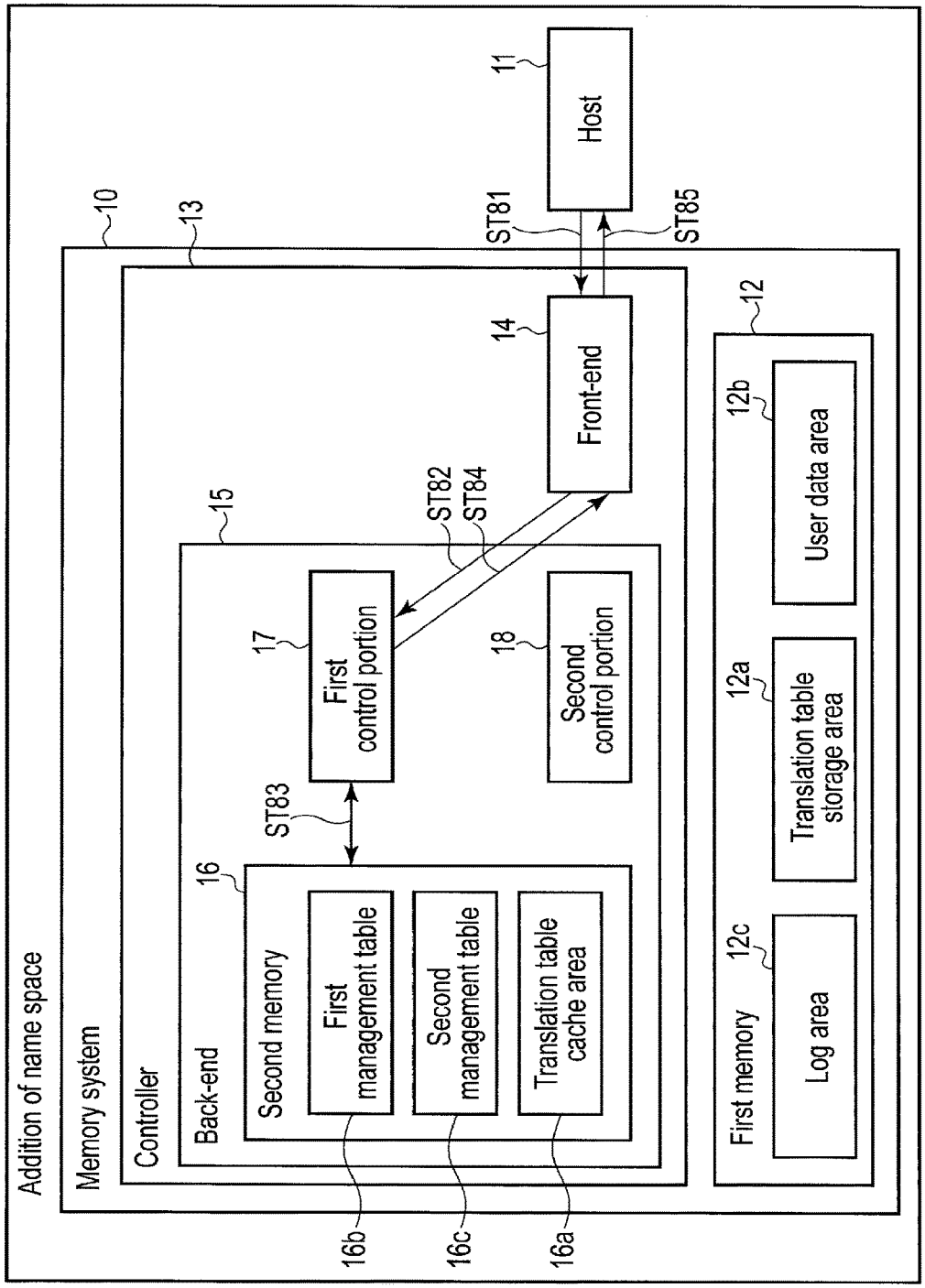
F I G. 8

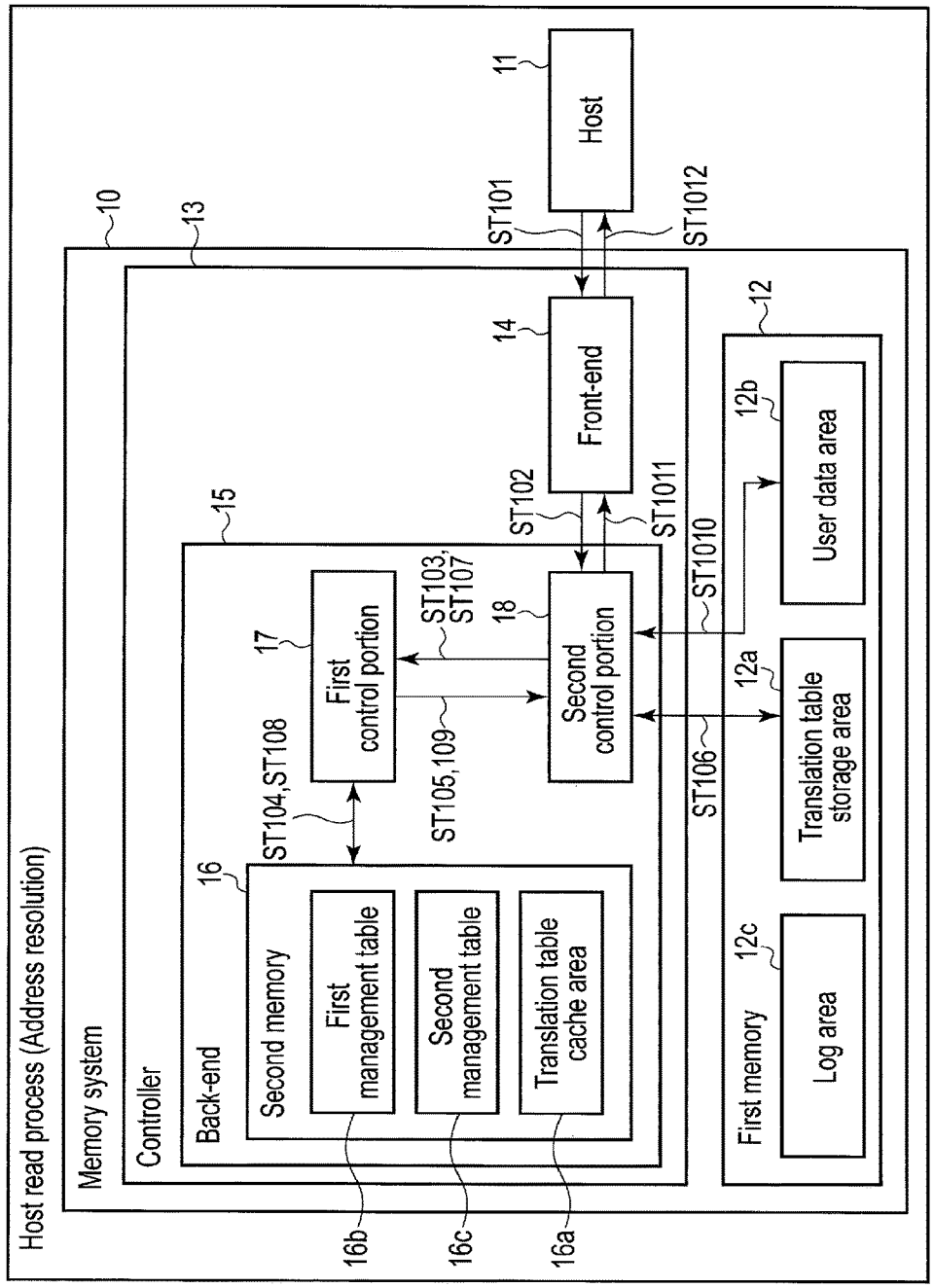
F I G. 10

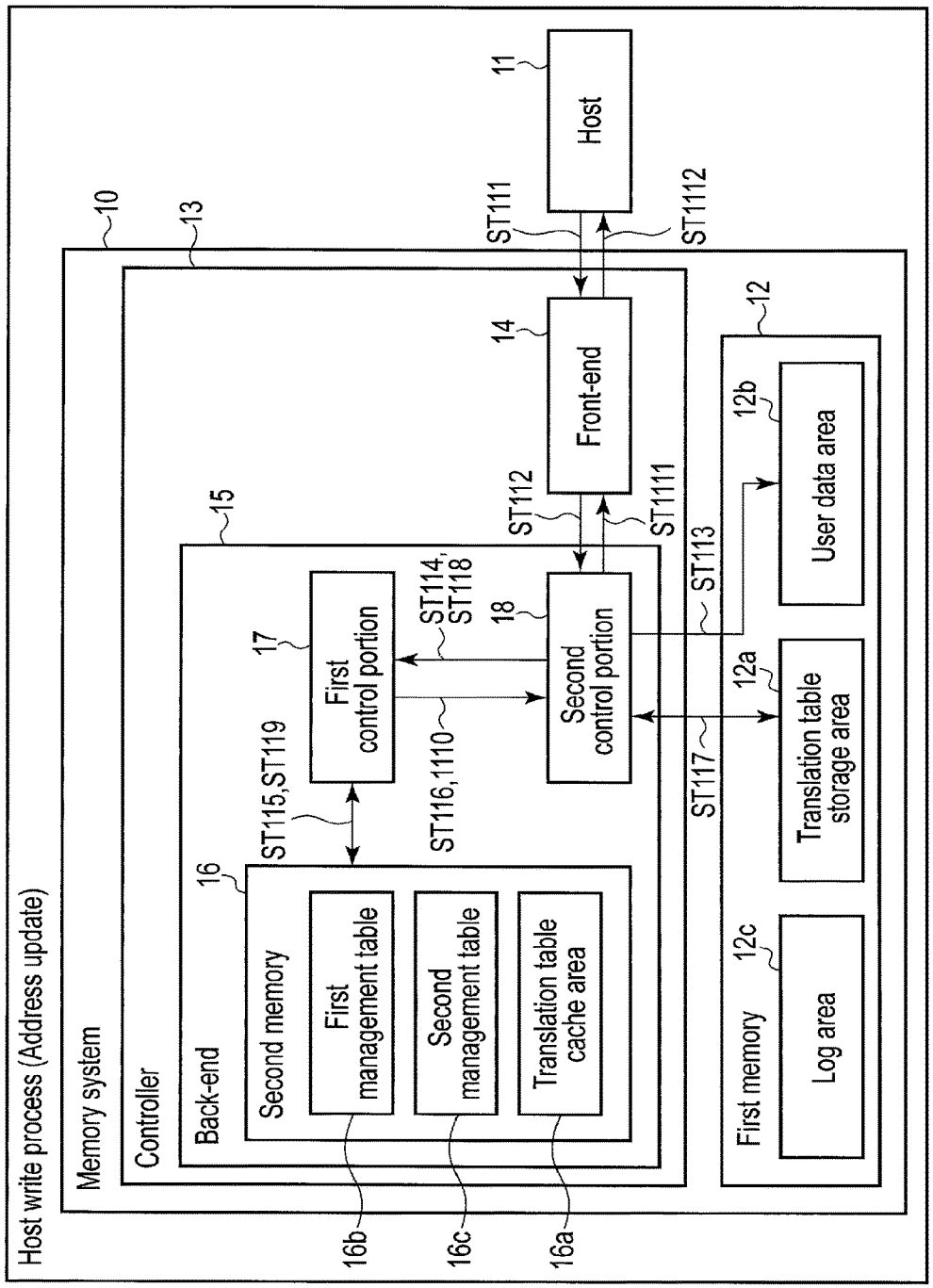
F I G. 11

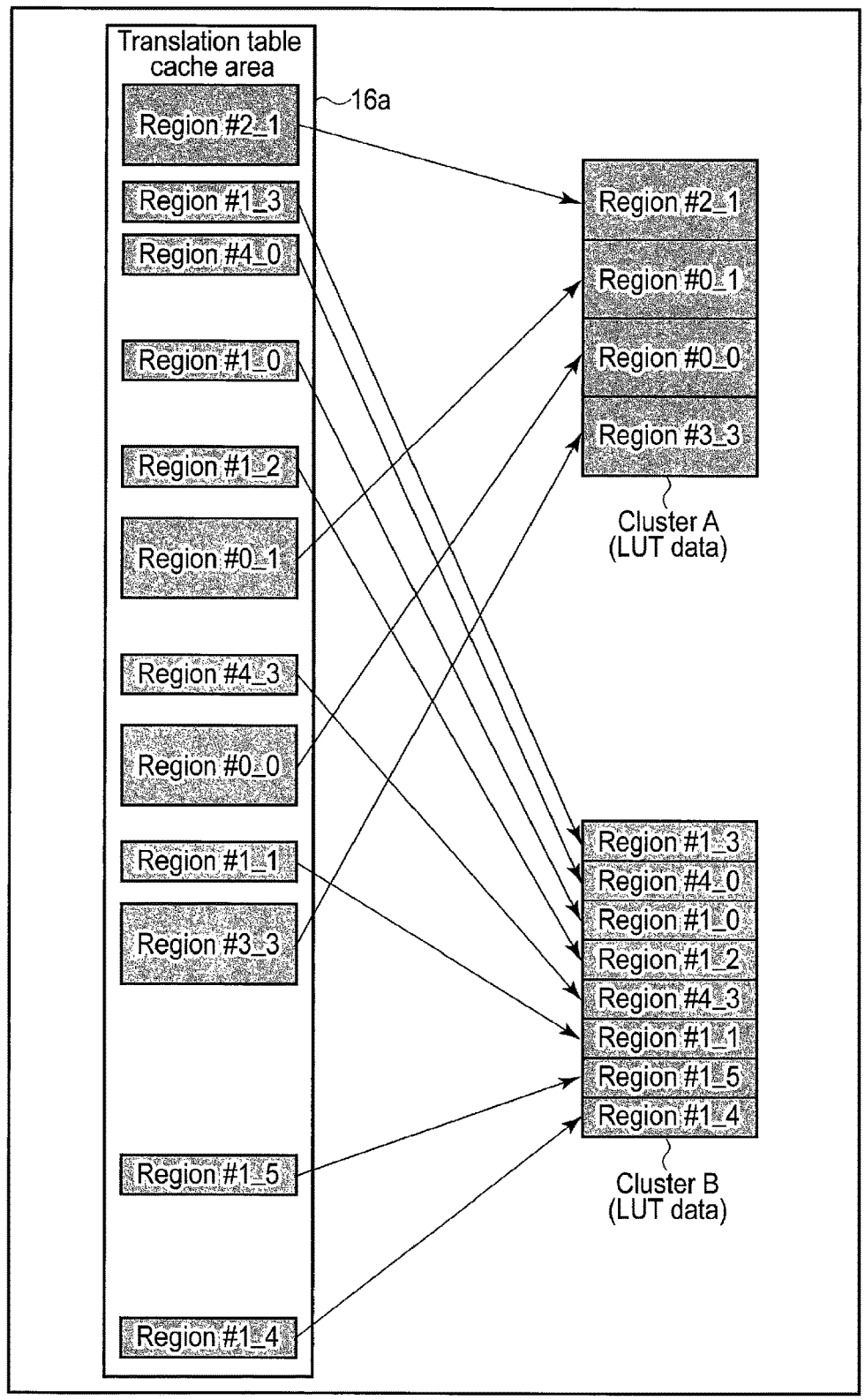
F I G. 13

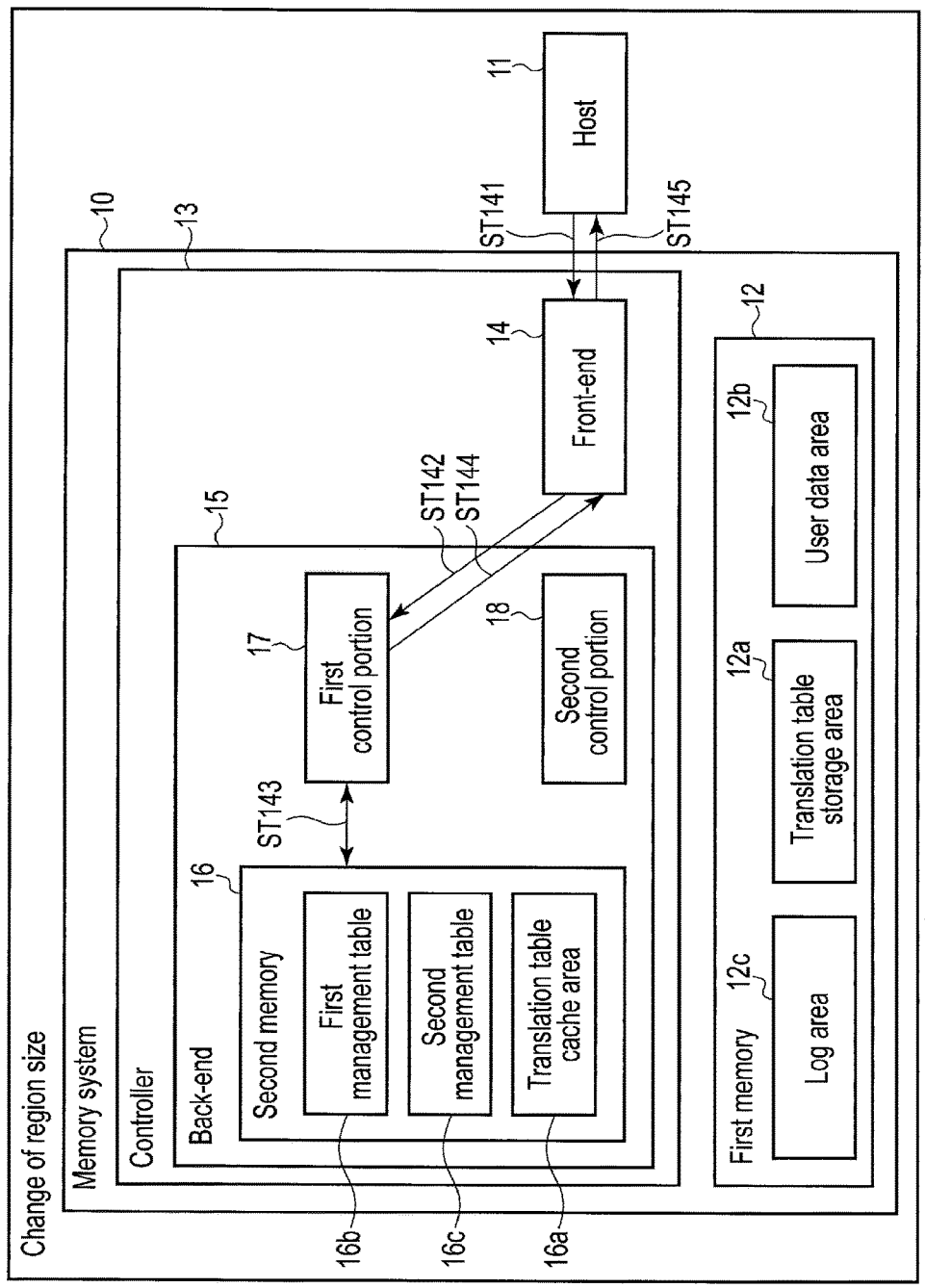
F I G. 14

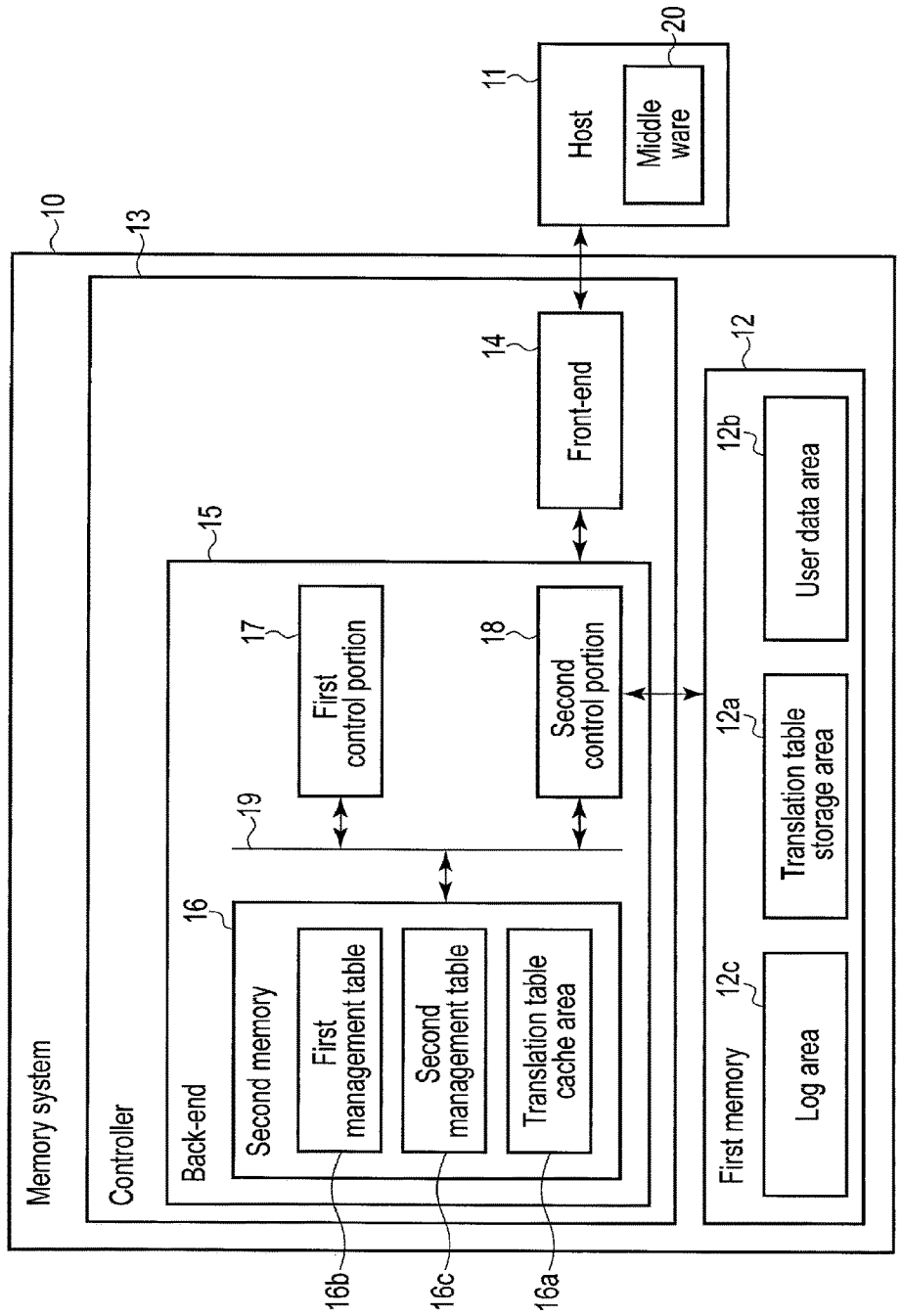
F I G. 16

MEMORY SYSTEM WITH ADDRESS TRANSLATION BETWEEN A LOGICAL ADDRESS AND A PHYSICAL ADDRESS

CROSS-REFERENCE TO RELATED APPLICATIONS

This application claims the benefit of U.S. Provisional Application No. 62/287,998, filed Jan. 28, 2016, the entire contents of which are incorporated herein by reference.

FIELD

Embodiments described herein relate generally to a memory system.

BACKGROUND

A memory system comprising a nonvolatile memory and a controller for controlling the nonvolatile memory has a translation table for resolving a logical address from a host to a physical address of the nonvolatile memory. The translation table is read from the nonvolatile memory, and is temporarily stored into a cache memory in the memory system. Generally, data transfer rate of the cache memory is higher than that of the nonvolatile memory.

BRIEF DESCRIPTION OF THE DRAWINGS

FIG. 1 is a figure illustrating a memory system according to an embodiment.

FIG. 2A and FIG. 2B are figures, each exemplarily illustrating a change in region size.

FIG. 5 is a figure exemplarily illustrating a first management table and second management tables.

FIG. 6 is a figure exemplarily illustrating log data stored in a log area in a first memory.

FIG. 8 is a figure illustrating exemplary steps of an addition of a namespace.

FIG. 10 is a figure illustrating exemplary steps of a host read process.

FIG. 11 is a figure illustrating exemplary steps of a host write process.

FIG. 13 is a figure exemplarily illustrating a collection of regions.

FIG. 14 is a figure illustrating exemplary steps of change in region size.

FIG. 16 is a figure exemplarily illustrating adjust of the region size by a middleware.

DETAILED DESCRIPTION

Figures 3, 4:
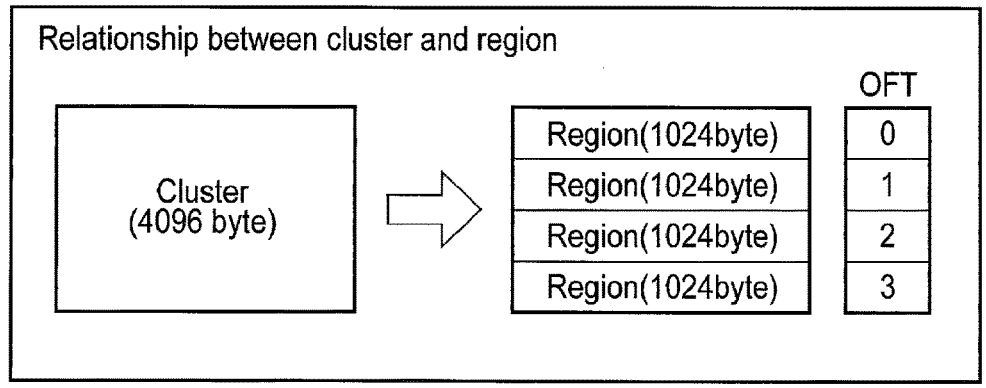
FIG. 3 and FIG. 4 are figures, each illustrating cluster-region relations.

In general, according to one embodiment, a memory system which is connectable to a host, the memory system comprises: a first memory as a nonvolatile memory storing information associated with an address translation between a logical address and a physical address; a second memory temporarily storing a part of the information at least; a first controller executing a read operation and a write operation of the information for the second memory in a first data unit, the first data unit being changeable and being a data size of one of regions obtained by dividing in a first address space, the part of the information at least stored in the first memory; and a second controller executing a read operation and a write operation of the information for the first memory in a second data unit different from the first data unit.

(Embodiments)

FIG. 1 illustrates a memory system in one embodiment.

A memory system 10 is a device which can be connected to a host 11. The memory system 10 may be any one of a Solid State Drive (SSD), a USB memory, a memory card, etc., for example. The host 11 is an electronic device, for example, a personal computer, a portable terminal, or the like (strictly speaking, a processor etc. in the electronic device). Furthermore, the host 11 may be an imaging device, such as a digital still camera or a video camera. Alternatively, the host 11 may be any one of a tablet computer, a smart phone, a game machine, a car-navigation system, a printer apparatus, a scanner apparatus, a server system, etc.

The memory system 10 has a first memory 12, which is a nonvolatile memory, and a controller 13 for controlling the first memory 12. The first memory 12 is a semiconductor memory which is capable of storing data in a nonvolatile manner. It is a NAND flash memory, for example. The first memory 12 may comprise memory cells, each having a two-dimensional structure or a three-dimensional structure.

The controller 13 receives a read command and a write command from the host 11, and controls an operation of reading or writing from or into the first memory 12.

The controller 13 includes a front end 14 and a back end 15. The front end 14 includes a structure to receive the read command and the write command from the host 11 and to notify the host 11 of completion of the read command and the write command. The front end 14 includes a host interface circuit. The back end 15 includes a structure to control an operation of reading or writing from or into the first memory 12.

In the read or write operation executed by the command from the host 11, data moves between the host 11, the controller 13, and the first memory 12. In the read or write operation, data is temporarily stored into the second memory 16. The second memory 16 may be a Static Random Access Memory (SRAM), a Synchronous Dynamic Random Access Memory (SDRAM), or the like, for instance. It is also possible that the second memory 16 may be a non-volatile RAM, such as a Magnetic Random Access Memory (MRAM), a Resistance Random Access Memory (ReRAM), a Ferroelectric Random Access Memory (FeRAM), or the like. It is furthermore possible that the second memory 16 may be provided outside the controller 13.

Access to the first memory 12 is performed by resolving a logical address supplied from the host 11 to a physical address based on a translation table. The translation table associates a logical address, which functions as an identifier of user data, with a physical address within a user data area 12b in which actually stores the user data, in the first memory 12.

The translation table is stored in a translation table storage area 12a in the first memory 12. A part or all of the translation table is read from the translation table storage area 12a into a translation table cache area 16a of the second memory 16. The second memory 16 temporarily stores the part or all of the translation table.

The second memory 16, a first control portion 17, and a second control portion 18 are connected to each other by a bus 19.

The first control portion 17 controls an operation of reading or writing from or into the second memory 16. For example, the first control portion 17 controls the operation of writing or reading the user data and the translation table into or from the second memory 16. The second control portion 18 controls an operation of reading or writing from or into the first memory 12. For example, the second control portion 18 controls the operation of writing or reading the user data and the translation table into or from the first memory 12.

Here, the memory system 10 provides the host 11 with one or more address spaces. An address space is a range of addresses which the host 11 can specify. A piece of address information which indicates a position in the address space is referred to as a logical address. When address spaces are provided, every one of the address spaces is named in order to distinguish each address space from the rest of the address spaces. An address space which the memory system 10 provides will be referred to as a Namespace. The host 11 specifies a position where a piece of data is located in the memory system 10 by using a logical address and an identifier for a Namespace. A logical address may be expressed as a Logical Block Address (LBA), for example.

In an address space, the first control portion 17 divides each of the user data, the translation table, etc. into first data units. The first control portion 17 reads or writes the user data, the translation table, etc., from or into the second memory 16 by the first data unit. The second control portion 18 reads or writes the user data, the translation table, etc., from or into the first memory 12 by the second data unit.

The first data unit is called a region, for example. The first data unit is a unit of data, based on which the host 11 performs its management, and the second data unit is a unit, based on which the first memory 12 executes its read/write operation. The second data unit is the same as or larger than the first data unit. For example, the second data unit is a natural number times of the first data unit, or $2^N$ times of the first data unit (N=0, 1, 2, 3, . . . ). The second data unit is called a cluster, for example. When the first memory 12 is a NAND flash memory, a cluster corresponds to 1 page which is a physical read/write unit of a NAND flash memory, for example.

In recent years, the first memory 12 tends to be larger in memory capacity in compliance with a demand that the memory system 10 should be much larger in memory capacity. In connection with this, a translation table and a management table, which is used to manage the translation table, is also becoming much larger. That is, a memory capacity is required to be larger and larger in order to store the translation table and the management table which is used to manage the translation table. However, making the second memory 16 that functions as a cache have a large capacity will incur increase of cost. Accordingly, it is not desirable.

Therefore, the following problems may occur. The memory area of the second memory 16 will be filled with the translation table and the management table which is used to manage the translation table. Alternatively, the memory area of the second memory 16 will be insufficient to store the whole translation table.

It is proposed as one of the methods of easing this problem to enlarge the first data unit (in region size). If the first data unit is enlarged on the assumption that the address space is of constant size, the number of first data units (the number of regions) which the address space can include will decrease. If the first data units within the address space decreases in number, pointers, each specifying a corresponding one of the first data units (regions) will decrease in number. Therefore, the management table which is used for managing the translation table can be made small.

However, enlargement (in region size) of the first data unit incurs increase in write amplification (WAF) of the translation table. The WAF is an index which indicates the relation between the number of writes which the host 11 instructs and the number of writes which are actually performed in the first memory 12. The number of writes which are actually performed in the first memory 12 is the same as or more than the number of writes which the host 11 instructs. The WAF is 1 when both are the same.

Generally, in the first memory 12, a write is performed in accordance with the instructions from the host 11. In addition, a write occurs by some kind of operations, such as wear leveling, garbage collection, and refresh. Therefore, the number of writes actually performed in the first memory 12 is more than the number of writes which the host 11 instructs. Therefore, the WAF is larger than 1 in value.

It is desired that the WAF should be as small as possible. It is because that, if the WAF is small and if there is an upper limit to the number of writes executed in the first memory 12, the life of the first memory 12 (a time until writes reach the maximum number of writes) will be long. It should be noted however that writing is executed for every first data unit as mentioned above. This means that writing ought to be executed on the basis of the whole first data unit even when only a portion of the first data unit should be written, for example. Therefore, enlargement of the first data unit will incur enlargement of the WAF.

For example, when physical addresses, each for accessing a corresponding one of the memory cells in the first memory 12, are of constant size, physical addresses which a first data unit (a region) can hold will increase in number as the first data unit will be larger (in region size).

Accordingly, if the first data unit is small, and if the number of physical addresses which the first data unit can hold is one, for instance, then overwriting the physical address in question will never incur occurrence of writing in the other physical addresses. In contrast, if the first data unit is large, and if the number of physical addresses which the first data unit can hold is 64, for instance, then overwriting one of the physical addresses in the first data unit will incur occurrence of writing in the other 63 physical addresses. This means enlarging the WAF.

In this way, reduction (in region size) of the first data unit will make the WAF small, but will incur enlargement of the management table which is used for managing the translation table. On the other hand, enlargement (in region size) of the first data unit will make small the management table which is used for managing the translation table, but will incur enlargement of the WAF. There is a trade-off between the WAF and the size of the management table which is used for managing the translation table.

Therefore, there is proposed as an exemplary system a memory system 10, in which the size (region size) of a first data unit will be changed solely by a controller 13 or with the help of a command from the host 11. It is also possible to apply the present exemplary system to, for example, what is called a host-managed memory system (e.g., a host-managed SSD), in which necessary information is shared between the memory system 10 and the host 11 and the process which the memory system 10 has independently performed until now can also be performed by the instructions from the host 11.

Moreover, in the exemplary system, the first data unit (region size) is changed for every address space. For example, an enterprise-oriented memory system (e.g., an SSD) has a function to operate one physical drive (hardware) as a plurality of logical drives (software). Address spaces which each logical drive manages are called namespaces.

Generally, the host 11 has different access patterns from namespace to namespace. Therefore, in the case of namespaces where reading and writing are performed frequently, such as those that are in, for example, an interactive web server or a data base in which data is updated for every second, the WAF will be prevented from becoming large only by making the first data unit small (in region size).

On the other hand, in the case of namespaces where reading is frequent but writing is rare, such as those that are in, for example, a static web server or a data base in which data is updated for every year, enlargement of the first data unit (enlargement in region size) makes it possible to reduce the size of the management table that is used for managing the translation table without adversely affecting of the WAF enlargement.

For example, in the case where the first data unit is of fixed size (region size) as illustrated in FIG. 2A (Comparative example), Namespace NS0 in which an operating system (OS) mainly subjected to reading is stored and Namespace NS1 in which a database frequently subjected to reading and writing is stored are the same in the first data unit size. In this case, wasteful writes may frequently occur each time the database in namespace NS1 is renewed, and the WAF becomes large.

On the other hand, in the case where the first data unit is of variable size (region size) as illustrated in FIG. 2B (Embodiment), the WAF will be made small at the time of database renewal by making Namespace NS0, in which the OS is stored, large in terms of first data unit and Namespace NS1, in which the database is stored, small in terms of first data unit.

It is assumed that memory capacity required for the OS and memory capacity required for the database are the same to simplify the explanation of what is illustrated in each of FIG. 2A and FIG. 2B. That is, as illustrated in FIG. 2A (Comparative example), when the OS needs four regions, the database also needs four regions. Moreover, when the number of regions required for the OS is changed from four to two as illustrated in FIG. 2B (Embodiment), one region size will be automatically large. In contrast, when the number of regions required for the database is changed from four to six, one region size will be automatically small.

In this way, in the embodiment of FIG. 2B, reduction of the first data unit assigned to Namespace NS1 in which the database is stored makes it possible to reduce the WAF when the database in namespace NS1 is renewed. It should be noted that, before Namespace NS1 is added, what exists in the address space is Namespace NS0 alone. In the embodiment, the first data unit assigned to Namespace NS0 is large (in region size), so that pointers each specifying a corresponding one of the first data units (regions) will decrease. Therefore, the management table which is used for managing the translation table will be small.

Now, the management table which is used for managing the translation table will be explained.

First of all, the following preconditions are set in order to simplify the following explanation. However, the set precondition is none other than an example. There is no intention to restrict the embodiment by this precondition.

For example, the size (cluster size) of the second data unit that is a unit of reading and writing the first memory 12 may be $2^N$ times (N=0, 1, 2, 3, ...) of the size (cluster size) of the first data unit that is a unit of reading and writing the second memory 16, as illustrated in FIG. 3. FIG. 3 illustrates a case of N=2. When N is 1 or larger than 1 (N=1, 2, 3, ...), a cluster includes a plurality of regions. In this case, a plurality of regions within one cluster are identified by offset numbers OFT (e.g., 0, 1, 2, 3, ...) attached to the respective regions.

When clusters and regions have the above-mentioned relation, the number of regions within a cluster, a region entry size, and the number of region entries will change according to the region size, as illustrated in FIG. 4, for example.

Here, the region entry size is the size of a physical address, and the number of region entries is the number of physical addresses within one region. Moreover, the physical address is data required to access one memory cell within the first memory 12. Furthermore, it is assumed that the region size is M (M=1, 2, 3, ...) times the size of a physical address.

Here, FIG. 4 illustrates an example, in which a cluster size is 4096 bytes and a region entry size is 4 bytes. As illustrated in FIG. 4, when a region entry size is 4 bytes and a cluster size is 4096 bytes, a minimum region size will be 4 bytes. Moreover, if conditions are the same, the number of regions in a cluster will be 1024, and the number of region entries will be 1, since the cluster size is 4096 bytes. Accordingly, even if one physical address in the first memory 12 is overwritten, no writing will occur in other physical addresses.

Moreover, when a region entry size is 4 bytes and a cluster size is 4096 bytes, a maximum region size will be 4096 bytes. Moreover, if conditions are the same, the number of regions in a cluster will be 1, and the number of region entries will be 1024, since a cluster size is 4096 bytes. Accordingly, if one physical address in the first memory 12 is overwritten, writing will occur in other 1023 physical addresses.

Furthermore, if a region size is set to be, for example, 256 bytes when a region entry size is 4 bytes and a cluster size is 4096 bytes, the number of regions in one cluster will be 16 and the number of region entries will be 64. Accordingly, if one physical address in the first memory 12 is overwritten, writing will occur in other 63 physical addresses.

FIG. 5 illustrates a management table which is used for managing a translation table under the above precondition. In FIG. 5, a first management table 16*b* and a second management table 16*c* respectively correspond to the first management table 16*b* within the second memory 16 of FIG. 1, and the second management table 16*c* within the second memory 16 of FIG. 1.

Let us suppose that there are (two) namespaces #0 and #1 in one memory system (in this embodiment). FIG. 5 illustrates exemplary regions in the respective namespaces #0 and #1.

When namespaces #0 and #1 are added to the memory system, the first control portion 17 prepares a first management table 16*b* and a second management table 16*c* for respectively managing namespace #0 and namespace #1, and stores them in the second memory 16.

The first management table 16*b* broadly indicates namespaces #0 and #1. The second management table 16*c* indicates for every one of namespaces #0 and #1 the relation between a plurality of regions stored in the first memory 12 and a plurality of regions stored in the second memory 16.

For example, the first management table 16b indicates a Namespace ID (NS_ID), a second management table address, a region entry size, and a total number of regions. NS_ID is an identifier (identification) for identifying each of namespaces #0 and #1. The second management table address is an address which specifies the second management table 16c.

Region entry size is determined for every namespace. The region entry size within namespace #0 (NS_ID=#0) is 1024 bytes (fixed), for example. The region entry size within namespace #1 (NS_ID=#1) is 256 bytes (fixed), for example. The total number of regions within namespace #0 (NS_ID=#0) is, for example, 300 and the total number of regions within namespace #1 (NS_ID=#1) is, for example, 4000.

The second management table address for namespace #0 (NS_ID=#0) is Addr_#0. Addr_#0 specifies the second management table (#0) 16c. Moreover, the second management table address for namespace #1 (NS_ID=#1) is Addr_#1. Addr_#1 specifies the second management table (#1) 16c.

The second management table 16c indicates an address in the first memory 12 for the region of namespace #0, and an address in the second memory 16 for the region of namespace #1. For example, the total number of regions within namespace #0 (NS_ID=#0) is 300. The second management table (#0) 16c gives Region Nos. 0-299 to the respective 300 regions in namespace #0, and indicates for every region a cache address, a physical address, and an offset number OFT.

Physical address of region No. 0 within the second management table (#0) 16c is, for example, PA#0_0. Moreover, the offset number OFT within cluster C0 specified by physical address PA#0_0 is 1. Therefore, region #0_0 is stored as translation table data (look-up table [LUT] data) in the position of the offset number 1 in cluster C0 of physical address PA#0_0 in the translation table storage area 12a of the first memory 12.

The first control portion 17 reads region #0_0 in the following way. The first control portion 17 consults the first management table 16b, and acquires the second management table (#0) 16c. The first control portion 17 accesses region #0_0 based on the physical address PA#0_0 and the offset number OFT (=1), both of which are indicated in the second management table (#0) 16c. The first control portion 17 temporarily stores region #0_0 in cache address CA#0_0 in translation table cache area 16a of the second memory 16, for example.

In this case, the first control portion 17 changes the cache address of region No. 0 within the second management table (#0) 16c into CA#0_0. This associates region #0_0, which is in the position of the offset number 1 in cluster C0 of physical address PA#0_0 in the first memory 12, with region #0_0, which is in the position of cache address CA#0_0 in the second memory 16.

Moreover, the physical address of region No. 1 within the second management table (#0) 16c is, for example, PA#0_1. Moreover, the offset number OFT within cluster C1 specified by physical address PA#0_1 is 2. Region #0_1 is therefore stored, as translation table data (LUT data), in the position of the offset number 2 in cluster C1 of physical address PA#0_1 in the translation table storage area 12a of the first memory 12.

The first control portion 17 reads region #0_1 from the first memory 12 in the following way. The first control portion 17 acquires the second management table (#0) 16c from the first management table 16b. The first control portion 17 accesses region #0_1 based on physical address PA#0_1 and the offset number OFT (=2), both of which are indicated in the second management table (#0) 16c. The first control portion 17 temporarily stores, for example, region #0_1 in cache address CA#0_1 in the translation table cache area 16a of the second memory 16.

In this case, the first control portion 17 changes the cache address of region No. 1 within the second management table (#0) 16c into CA#0_1. This associates region #0_1, which is in the position of the offset number 2 in cluster C1 of physical address PA#0_1 in the first memory 12, with region #0_1, which is in the position of cache address CA#0_1 in the second memory 16.

Furthermore, physical address of region No. 2 in the second management table (#0) 16c is, for example, PA#0_0, and is the same as physical address of region No. 0. However, the offset number OFT within cluster C0 specified by physical address PA#0_0 is 2. Region #0_2 is therefore stored as translation table data (LUT data) in the position of the offset number 2 in cluster C0 of physical address PA#0_0 in the translation table storage area 12a of the first memory 12.

Before region #0_2 is read out of the first memory 12, region #0_2 is not stored in the translation table cache area 16a of the second memory 16. In this case, nothing is written to the cache address of region No. 2 in the second management table (#0) 16c.

Moreover, the total number of regions within namespace #1 (NS_ID=#1) is 4000. Therefore, the second management table (#1) 16c attaches region Nos. 0-3999 to the respective 4000 regions in namespace #1, and indicates for every region a cache address, a physical address, and an offset number OFT.

The physical address of region No. 0 within the second management table (#1) 16c is, for example, PA#1_0. Moreover, the offset number OFT within cluster C2 specified by physical address PA#1_0 is 0. Region #1_0 is therefore stored as translation table data (LUT data) in the position of the offset number 0 in cluster C2 of physical address PA#1_0 in the translation table storage area 12a of the first memory 12.

The first control portion 17 reads region #1_0 from the first memory 12 in the following way. The first control portion 17 acquires the second management table (#1) 16c from the first management table 16b. The first control portion 17 accesses region #1_0 based on physical address PA#1_0 and the offset number OFT (=0), both of which are indicated in the second management table (#1) 16c. The first control portion 17 temporarily stores, for example, region #1_0 in cache address CA#1_0 in translation table cache area 16a of the second memory 16.

In this case, the first control portion 17 changes the cache address of region No. 0 within the second management table (#1) 16c into CA#1_0. This associates region #1_0, which is in the position of the offset number 0 in cluster C2 of physical address PA#1_0 in the first memory 12, with region #1_0, which is in the position of cache address CA#1_0 in the second memory 16.

In the example of FIG. 5, namespace #0 (NS_ID=#0) includes regions #0_0, #0_1, and #0_2, each having a comparatively large region size. Therefore, the total number of regions is comparatively small (300), and the number of pointers for specifying these regions (cache address, physical address, OFT) is also small (corresponding to the memory capacity of the second memory 16).

In contrast, namespace #1 (NS_ID=#1) includes regions #1_0, . . . , each having a comparatively small region size.

Therefore, the total number of regions is comparatively large (4000). The number of pointers (cache address, Physical address, OFT) for specifying these regions is also large. However, every region is small. Therefore, the WAF will be small.

Now, a log area 12c which is in the first memory 12 and is illustrated in FIG. 1 will be explained.

The log area 12c keeps, for example, the histories of respective regions in a cluster for every second data unit (cluster) that is a unit of reading or writing the first memory 12.

For example, as illustrated in FIG. 6, the log area 12c comprises data rows, each including a log header and a plurality of log entries following the log header. A log header includes a physical address and the number of regions in a cluster. Each log entry includes NS_ID, Region No., and offset number OFT. The number of log entries is equal to the number of regions in a cluster.

For example, there are data rows as many as clusters. And the history of a cluster is recorded on a data row. Here, the embodiment presents a technique of making variable the number of regions in a cluster. Therefore, the history of number of regions in a cluster within a log header is peculiar to the embodiment.

Log entries increase in number as regions in a cluster increases in number (as each region in a cluster becomes smaller). That is, the length of a data row (which corresponds to the number of regions in one cluster) is also variable. A data row becomes longer as regions in a cluster increase in number, and becomes shorter as regions in a cluster decrease in number.

Now, how the above-mentioned memory system operates will be explained.

Figure 7:
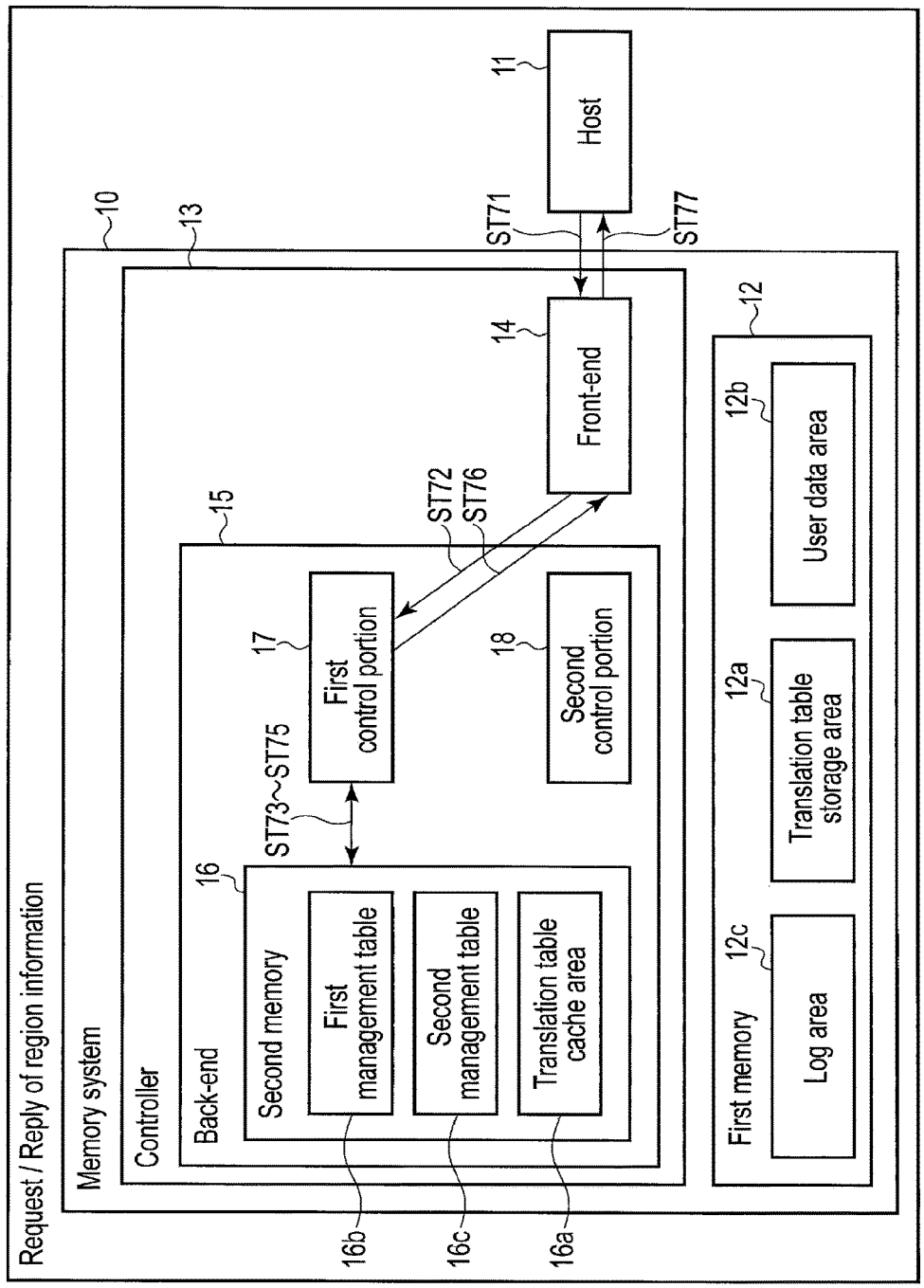
FIG. 7 is a figure illustrating exemplary steps of a request and a reply of region information.

FIG. 7 illustrates exemplary steps of request/reply of region information.

In response to the request from the host 11, the memory system 10 transmits to the host 11 at least one of the maximum number of regions which the second memory 16 can store, the number of regions in use, and the number of remaining regions obtained by subtracting the number of regions in use from the maximum number of regions which the second memory 16 can store.

First, a command (requesting one of the maximum number of regions which the second memory 16 can store, the number of regions in use, and the number of remaining regions) from the host 11 is received by the front end 14, and is transmitted to the first control portion 17 in the back end 15 (Steps ST71-ST72).

The first control portion 17 acquires from, for example, a memory map, which the second memory 16 has, the maximum number of regions which the second memory 16 can store (step ST73).

Moreover, the first control portion 17 acquires the number of regions in use from the first management table 16b (step ST74). For example, as illustrated in FIG. 5, the first management table 16b keeps the total number of regions for every namespace NS_ID (=#0, #1, ... ). Therefore, the first control portion 17 can acquire the number of regions in use by summing up all the total numbers of regions.

Furthermore, the first control portion 17 obtains the number of remaining regions by subtracting the number of regions in use from the maximum number of regions which the second memory 16 can store (step ST75). The number of remaining regions means the number of regions which can be assigned to new name spaces.

Based on the command from the host 11, the first control portion 17 transmits to the front end 14 at least one of the maximum number of regions which the second memory 16 can store, the number of regions in use, and the number of remaining regions (step ST76).

The front end 14 transmits to the host 11 at least one of the maximum number of regions which the second memory 16 can store, the number of regions in use, and the number of remaining regions (step ST77).

FIG. 8 illustrates exemplary steps to add a namespace.

The host 11 can request the memory system 10 to execute an addition of a namespace. While the addition of a namespace is executed, the host 11 can refer to the information having been obtained by the steps of FIG. 7 (the maximum number of regions which the second memory 16 can store, the number of regions in use, or the number of remaining regions).

First of all, the host 11 issues to the memory system 10 a command which requests to add a namespace (step ST81). At this moment, the host 11 also presents to the memory system 10 some pieces of information, including the number of logical addresses LBA used in each new namespace, a region size of each new namespace, etc.

When the front end 14 receives the command that is sent from the host 11 and requests to add a namespace, the front end 14 transmits the information to the first control portion 17 in the back end 15 (step ST82).

The first control portion 17 receives the request to add a namespace. When the addition of a namespace is possible, it obtains new namespace ID (NS-ID), and adds new namespace ID to the first management table 16b. For example, new namespace ID is the smallest number that has not been used yet. For example, when there already exist #0 and #1 as NS_ID's, then #2 is assigned as a new namespace ID, as illustrated in FIG. 5.

Moreover, a second management table address of NS_ID=#2 is also assumed to be the smallest address that is not used yet, for example. For example, when there already exist Addr_#0 and Addr_#1 as second management table addresses, as illustrated in FIG. 5, then Addr_#2 will be assigned to NS_ID=#2 as a second management table address.

When it is possible to add a namespace, the first control portion 17 obtains a new namespace ID (NS-ID), adds the obtained new namespace ID to the first management table 16b, and generates a second management table 16c (#2) which is associated with the new namespace ID as an additional second management table (Step ST83).

When the addition of a namespace is possible, the first control portion 17 transmits a notification of completion (success in addition) to the front end 14 (step ST84). The notification of completion (success in addition) comprises information, including a new namespace ID, a region size, etc. The front end 14 transmits the notification of completion (success in addition) to the host 11 (step ST85).

Moreover, when the addition of a namespace is impossible, the first control portion 17 transmits a notification of completion (failure in addition) to the front end 14 (step ST84). The front end 14 transmits the notification of completion (failure in addition) to the host 11 (step ST85).

The first control portion 17 determines whether it is possible to add a namespace or not as follows:

First of all, the number of regions added to a namespace (additional regions) is calculated. The number of additional regions is obtained by dividing the number of logical addresses LBA which the host 11 provides by a region size which the host 11 provides.

The first control portion 17 compares the number of added regions with the number of remaining regions.

The fact that the number of added regions is the same as or less than the number of remaining regions means that data of a plurality of regions in a new namespace can be stored in the second memory 16. In this case, the first control portion 17 therefore determines that the addition of a namespace is possible.

In this case, the first control portion 17 obtains a new namespace ID (NS-ID), adds the new namespace ID to the first management table, and adds a second management table associated with the new namespace ID (step ST83).

On the other hand, if the number of additional regions is larger than the number of remaining regions, pieces of data in respective regions in the new namespace cannot be stored in the second memory 16. In this case, the first control portion 17 therefore determines that the addition of a namespace is impossible.

It should be noted that the first control portion 17 can perform a process of increasing the number of remaining regions before adding a namespace. That is, enlargement in the region size of each of the existing namespaces incurs reduction in the total number of regions (regions in use) in each of the existing namespaces. Therefore, the number of remaining regions increases.

No matter how the addition of a namespace is attempted after the number of remaining regions has been increased in this way, no namespace can be added. Therefore, the possibility of sending a notification of completion (failure in addition) decreases.

Moreover, the host 11 in the example specifies the region size of a new namespace. However, specification of the region size from the host 11 can be omitted. In such a case, the host 11 notifies the memory system 10 of the addition of a namespace and the number of logical addresses LBA.

When a specification of a region size is not received from the host 11, the memory system 10 sets a suitable region size, and adds a namespace having the set region size.

An example in which a suitable region size is set will be explained.

First of all, a standard region size is set in the memory system 10. The standard region size may be fixed or, alternatively, may be changed according to the environment where the memory system 10 is used. It is desirable that the standard region size should be set to successfully make a compromise between the used quantity of the second memory 16 and the increase in the WAF.

The first control portion 17 receives a request to add a namespace. Then, the first control portion 17 assumes that the namespace has a standard region size, and determines whether the addition of the namespace is possible or not.

Specifically, the first control portion 17 divides a standard region size into the number of logical addresses LBA which the host 11 instructs, and gets the number of regions which can be added.

The first control portion 17 compares the number of additional regions with the number of remaining regions.

The fact that the number of additional regions is the same as or less than the number of remaining regions means that the data in the respective regions in the new namespace can be stored in the second memory 16. Therefore, the first control portion 17 determines that the addition of the namespace is possible.

In this case, the first control portion 17 obtains an ID of the new namespace (NS-ID), and adds to the first management table the new namespace ID and a second management table associated with the new namespace ID (step ST83).

On the other hand, the fact that the number of additional regions is larger than the number of remaining regions means that the data in the regions in the new namespace can not be stored in the second memory 16. Therefore, the first control portion 17 determines that the addition of the namespace is impossible.

In this case, the first control portion 17 slightly enlarges the region size (the standard region size), assumes that the slightly enlarged new region size is the region size of the namespace, and determines again whether the addition of the namespace is possible or not.

This operation is repeatedly performed until the addition of the namespace is possible.

For example, potential region sizes may be set as follows: Snormal<S0<S1<S2< . . . <Smax.

It should be noted here that Snormal is a standard region size and Smax is a maximum region size. When the host 11 does not specify any region size, the first control portion 17 gradually enlarges the region size from Snormal toward Smax until the addition of the namespace is possible.

When the addition of the namespace is possible, the first control portion 17 obtains an ID of the new namespace (NS-ID), adds the new namespace ID and a second management table associated with the new namespace ID to the first management table (step ST83). Moreover, a notification of completion (success in addition) is transmitted to the host 11 (Steps ST84-ST85).

However, in a case where the addition of the namespace is impossible even if the region size is set as a maximum region size Smax for the namespace, a notification of completion (failure in addition) is transmitted to the host 11 (Steps ST84-ST85).

Figure 9:
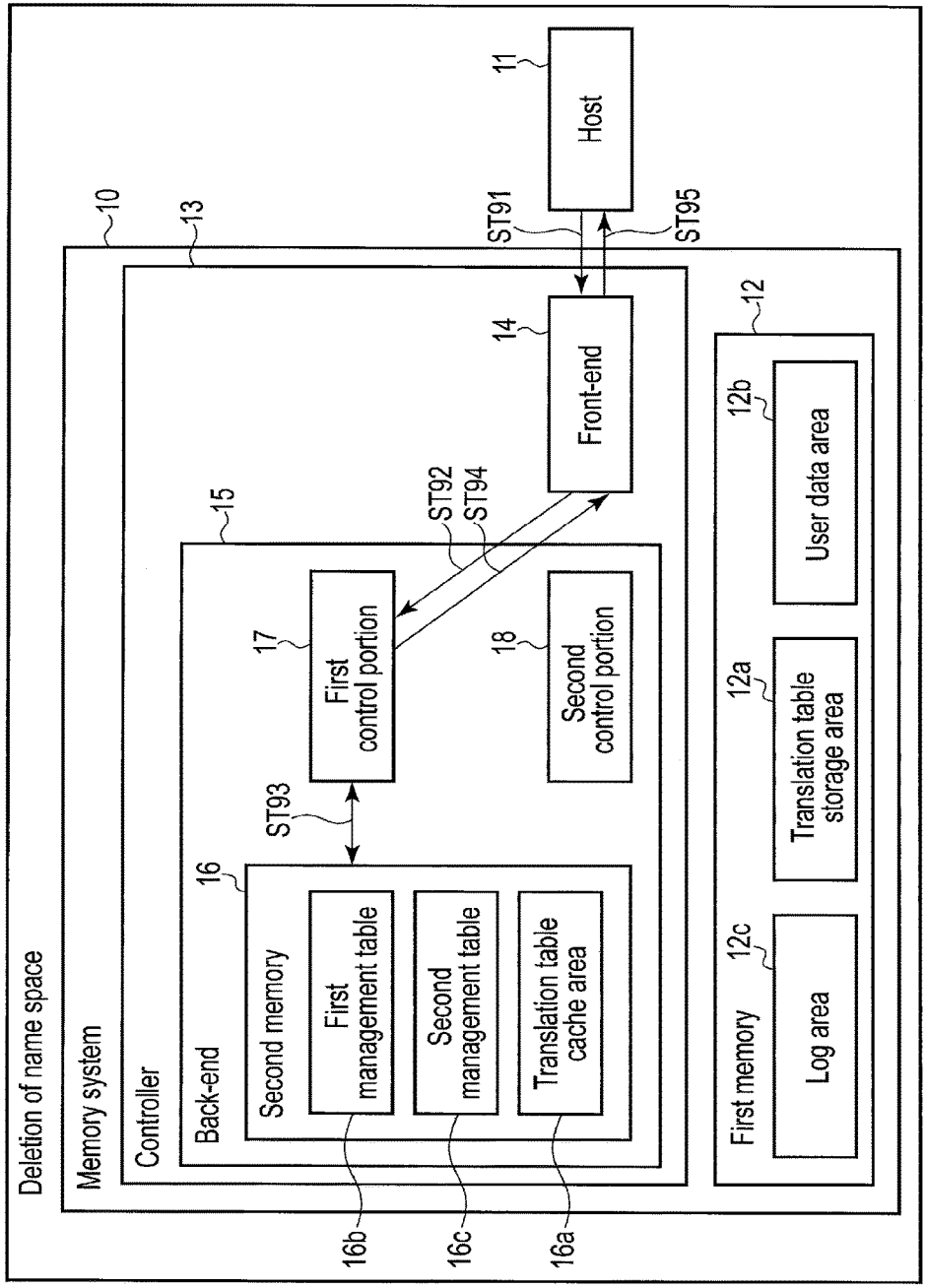
FIG. 9 is a figure illustrating exemplary steps of a deletion of a namespace.

FIG. 9 illustrates exemplary steps of deleting a namespace.

The host 11 can request the memory system 10 to delete a namespace.

First of all, the host 11 issues a command which requests the memory system 10 to delete a namespace (step ST91). At this moment, the host 11 presents the memory system 10 with an ID of the namespace (NS_ID) which is the target of deletion.

The front end 14 receives a command that is sent from the host 11 and requests to delete a namespace, and then transmits the information to the first control portion 17 in the back end 15 (step ST92).

Upon receipt of the request to delete the namespace, the first control portion 17 will determine based on the namespace ID (NS_ID) presented by the host 11 whether or not the namespace which is the target of deletion exists in the first management table 16b.

When the namespace which is the target of deletion exists in the first management table 16b, the first control portion 17 deletes from the first management table 16b the namespace ID (NS_ID), which is the target of deletion, and any information associated with the namespace ID in question. For example, upon deletion of a namespace (NS_ID=#1) illustrated in FIG. 5, the first control portion 17 not only deletes NS_ID=#1 from the first management table 16b, but also deletes the second management table address (=Addr_#1) and the second management table (#1) 16c, both associated with NS_ID=#1. Moreover, the first control portion 17 changes the region entry size associated with NS_ID=#1 from 256 into 0, and changes the total number of regions from 4000 to 0 (step ST93).

The first control portion 17 deletes the namespace, and then transmits a notification of completion (success in deletion) to the front end 14 (step ST94). The front end 14 transmits to the host 11 a notification of completion (success in deletion) (step ST95).

In contrast, when the namespace which is the target of deletion does not exist in the first management table 16*b*, the first control portion 17 transmits a notification of completion (failure in deletion) to the front end 14 (step ST94). The front end 14 transmits the notification of completion (failure in deletion) to the host 11 (step ST95).

Incidentally, when a namespace is deleted, the second management table 16*c* associated with the namespace which is the target of deletion will be deleted, and the memory capacity of the second memory 16 will increase for that amount. Therefore, it is possible to perform a process of decreasing the region size of each of the existing namespaces (increasing the number of regions) after a namespace deletion has been made.

Let us suppose, for instance, that a namespace (NS_ID=#1) illustrated in FIG. 5 has been deleted.

Then, it is possible to decrease in region size the existing namespace (NS_ID=#0) and to change the total number of regions of the namespace (NS_ID=#0) from 300 to any number exceeding 300 (for example, 1200).

It should be noted that steps of changing a region size will be described later.

Moreover, deletion of a namespace is accompanied by deletion of the second management table 16*c* associated with the namespace which is the target of deletion. Accordingly, there is a possibility that the second management table 16*c* may be fragmented. For example, deletion of a namespace (NS_ID=#0) illustrated in FIG. 5 brings about deletion of second management table address Addr_#0 associated with NS_ID=#0. Accordingly, the remaining second management table addresses associated with the corresponding namespaces NS_ID=#1, . . . will be discontinuous.

Consequently, the second management table addresses may be reset in such a case, such that the respective second management table addresses associated with the existing namespaces NS_ID=#1, . . . may continue from the smallest address (Addr_#0, Addr_#1, . . . ). The second management table addresses may be reestablished by rebooting the memory system 10, for example.

FIG. 10 illustrates an exemplary host read process.

Steps ST103-ST109 in the host read process belong to an address resolution in which a logical address is changed to a physical address based on the translation table.

The host 11 can request the memory system 10 to read the user data.

First of all, the host 11 issues a command which requests the memory system 10 to read the user data (step ST101). At this moment, the host 11 presents the memory system 10 with logical address LBA and namespace ID (NS_ID), both specifying the user data.

The front end 14 receives the command, which is sent from the host 11 and requests that the user data should be read, and transmits the information to the second control portion 18 in the back end 15. The front end 14 changes logical address LBA supplied from the host 11 to logical address LCA which is a unit of reading and writing the first memory 12 (step ST102).

The second control portion 18 requests the first control portion 17 to perform an address resolution for changing logical address LCA into physical address PA. At this moment, the second control portion 18 presents the first control portion 17 with logical address LCA of the user data and namespace ID (NS_ID) in which the translation table is stored (step ST103).

First of all, the first control portion 17 acquires the translation table.

The first control portion 17 searches the first management table 16*b* for an ID of a namespace which stores the translation table. When the ID does not exist, the first control portion 17 notifies the second control portion 18 of the nonexistence of the ID (ST109). In this case, the second control portion 18 transmits a notification of completion (failure in reading) to the front end 14 (step ST1011). The front end 14 transmits the notification of completion (failure in reading) to the host 11 (step ST1012).

The first control portion 17 searches the first management table 16*b* for namespace ID which stores the translation table. When the first control portion 17 finds the namespace ID, the first control portion 17 calculates a region number necessary to obtain the translation table from the first management table 16*b*. For example, a region number will be obtained by dividing the logical address LCA by the number of region entries. Moreover, the number of region entries is obtained by dividing the region size by the region entry size.

The first control portion 17 calculates a region number necessary to obtain the translation table, refers to the second management table 16*c* associated with the namespace ID which stores the translation table, and confirms whether a cache address exists in the region number. If the cache address exists, the first control portion 17 will read data from the region of the translation table cache area 16*a* indicated by the cache address (step ST104).

On the other hand, when the cache address does not exist, the first control portion 17 acquires a physical address and an offset number OFT from the second management table 16*c*, and gives these pieces of information to the second control portion 18 as a cluster read request (step ST105). The second control portion 18 reads region data from the translation table storage area 12*a* of the first memory 12 based on the physical address and the offset number OFT (step ST106).

The region data read from the translation table storage area 12*a* of the first memory 12 is transmitted to the first control portion 17 along with a notification of cluster read completion (step ST107). The first control portion 17 stores the region data having been read from the first memory 12 into the translation cache area 16*a* of the second memory 16. Moreover, the first control portion 17 writes the cache address in the second management table 16*c* of the second memory 16, and reads the region data from the cache address in the translation table cache area 16*a* (step ST108).

The first control portion 17 can obtain the translation table by reading such region data.

The first control portion 17 obtains the translation table, and changes logical address LCA to physical address PA based on the obtained translation table. The first control portion 17 transmits to the second control portion 18 the physical address PA and a notification of address resolution completion (step ST109).

The second control portion 18 reads the user data from the user data area 12*b* of the first memory 12 using the physical address PA (step ST1010). And the second control portion 18 transmits to the front end 14 the read data and a notification of completion (success in reading) (step ST1011). The front end 14 transmits to the host 11 the read data and the notification of completion (success in reading) (step ST1012).

FIG. 11 illustrates an exemplary host write process.

Steps ST114-ST119 in the host write process are steps of an address update.

The host 11 can request the memory system 10 to store the user data.

First of all, the host 11 issues a command which requests the memory system 10 to store the user data (step ST111). At this moment, the host 11 presents the memory system 10 with logical address LBA of the user data, write data (user data), and namespace ID (NS_ID).

The front end 14 receives the command that is sent from the host 11 and requests to store the user data, and transmits the information to the second control portion 18 in the back end 15. The front end 14 changes logical address LBA supplied from the host 11 to logical address LCA which is a unit of reading and writing the first memory 12 (step ST112).

The second control portion 18 stores write data (user data) stored in logical address LCA into the user data area 12b of the first memory 12. That is, the second control portion 18 associates logical address LCA with an unused physical address PA of the first memory 12, and stores the write data (user data) stored in logical address LCA into the unused physical address PA (step ST113).

The second control portion 18 executes the storage of the write data, and requests the first control portion 17 to execute an address update for updating the translation table. At this moment, the second control portion 18 presents the first control portion 17 with logical address LCA of the write data, physical address PA of the write data, and namespace ID (NS_ID) in which the translation table is stored (step ST114).

First of all, the first control portion 17 acquires the translation table.

The first control portion 17 searches the first management table 16b for namespace ID which stores the translation table. When it is found that the namespace ID does not exist, the first control portion 17 notifies the second control portion 18 of the absence of the namespace ID (ST1110). In this case, the second control portion 18 transmits a notification of completion (write failure) to the front end 14 (step ST1111). The front end 14 transmits the notification of completion (write failure) to the host 11 (step ST1112).

The first control portion 17 searches the first management table 16b for namespace ID which stores the translation table. When there exists namespace ID, the first control portion 17 calculates a region number necessary to obtain the translation table from the first management table 16b.

After a region number necessary to obtain the translation table has been calculated, the first control portion 17 refers to the second management table 16c associated with the namespace ID which stores the translation table, and confirms whether the cache address exists or not through the use of the region number. When there exists the cache address, the first control portion 17 updates the physical address PA stored there in accordance with the second physical address and the offset number OFT, both of which the management table 16c holds (step ST115).

On the other hand, when there does not exist the cache address, the first control portion 17 acquires a physical address and an offset number OFT from the second management table 16c, and gives these pieces of information to the second control portion 18 as a cluster read request (step ST116). The second control portion 18 reads region data from the translation table storage area 12a of the first memory 12 based on the physical address and the offset number OFT (step ST117).

The region data read from the translation table storage area 12a of the first memory 12 is transmitted to the first control portion 17 along with the notification of cluster read completion (step ST118). The first control portion 17 stores the region data having been read from the first memory 12 in the translation cache area 16a of the second memory 16. Moreover, the first control portion 17 writes a cache address in the second management table 16c of the second memory 16, and updates physical address PA held in the position indicated by the second physical address and the offset number OFT, both in the management table 16c (step ST119).

When renewal of physical address PA stored in the position indicated by the second physical address and the offset number OFT, both in the management table 16c, is completed, the first control portion 17 will transmit a notification of address update completion to the second control portion 18 (step ST1110).

The second control portion 18 receives the notification of address update completion. Then, it transmits the notification of completion (write success) to the front end 14 (step ST1111). The front end 14 transmits the notification of completion (write success) to the host 11 (step ST1112).

Figure 12:
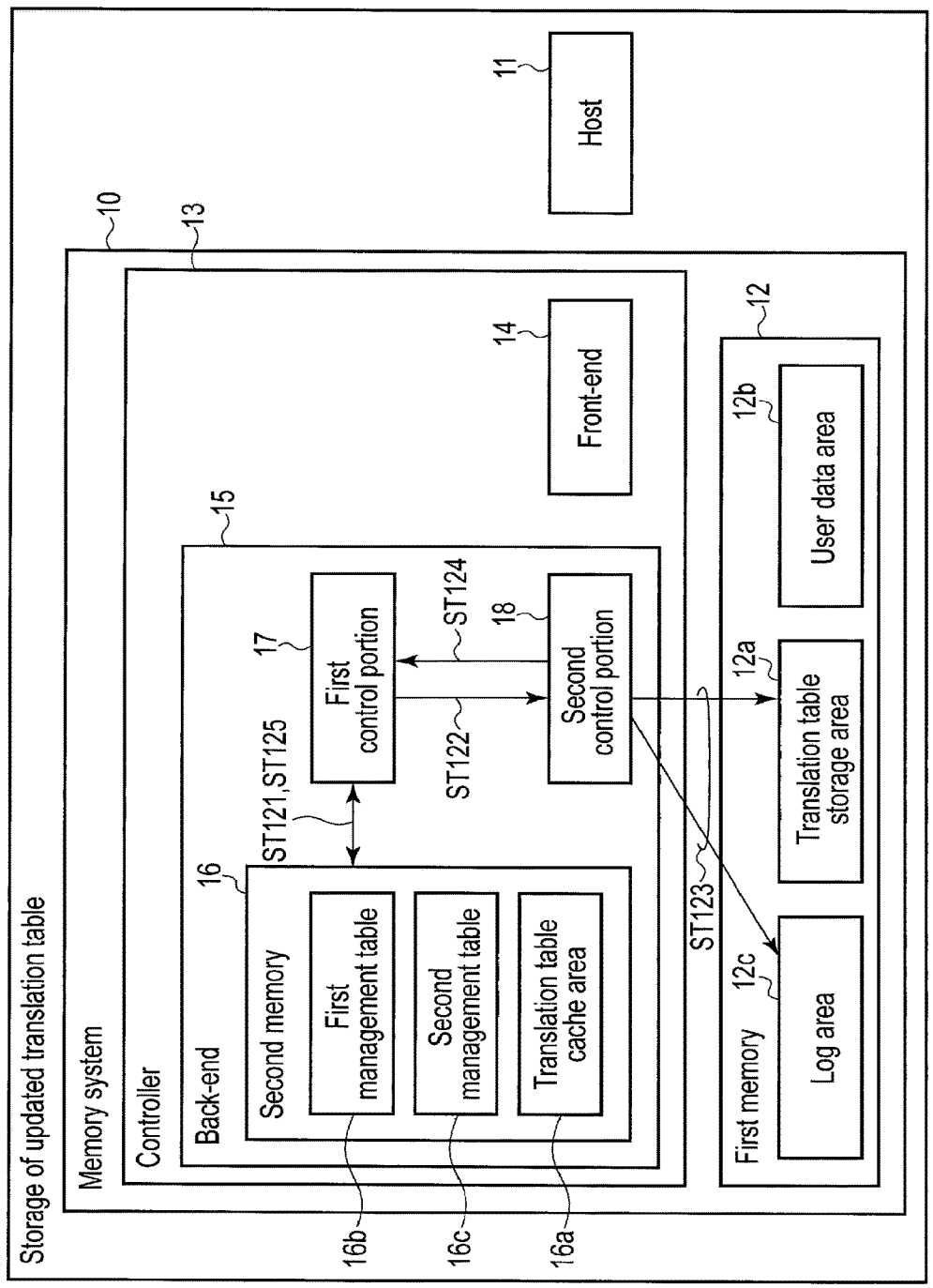
FIG. 12 is a figure illustrating exemplary steps of storage of an updated translation table.

FIG. 12 illustrates exemplary steps of storing an updated translation table.

An operation in which a piece of region data temporarily stored in the translation table cache area 16a of the second memory 16 is stored in the translation table storage area 12a of the first memory 12 will be explained. Namely, how the translation table (which is a piece of volatile data) is maintained by update as if it is a piece of nonvolatile data will be explained.

This operation may be executed by a command from the host 11 or may be independently executed by the memory system 10 alone. Here, the latter case will be explained.

First of all, the first control portion 17 reads pieces of region data from the translation cache area 16a of the second memory 16. Moreover, the first control portion 17 reads the translation cache area 16a of the second memory 16 and collects a plurality of regions in order to make the size of collected regions equal or close to one cluster (step ST121).

For example, when the sum total size of four regions is equal or close to one cluster, as indicated in FIG. 13, then four regions #2_1, #0_1, #0_0, and #3_3 in the translation cache area 16a are collected. These regions constitute one cluster (LUT data) A. Moreover, when the sum total size of eight regions is equal or close to one cluster, then eight regions #1_3, #4_0, #1_0, #1_2, #4_3, #1_1, #1_5, and #1_4 in the translation cache area 16a are collected. These regions constitute one cluster (LUT data) B.

It should be noted that regions which constitute one cluster may be selected from anywhere, for example, different namespaces, as long as the regions are the same size.

Alternatively, the regions which constitute one cluster may differ in size. In this case, however, it is necessary to devise a method for collecting regions or a format of the log area (LUT log) 12c.

The first control portion 17 generates clusters A and B as illustrated in FIG. 13, for example. Subsequently, the first control portion 17 transmits the clusters (LUT data) A and B to the second control portion 18, and requests the second control portion 18 to write down clusters A and B (step ST122).

The second control portion 18 writes clusters A and B in the transfer table storage area 12a of the first memory 12. Specifically, the second control portion 18 writes clusters A and B in unused physical addresses PA in the first memory 12. Moreover, the second control portion 18 updates the LUT log in Log area 12c of the first memory 12 (step ST123).

For example, when the writing of clusters A and B is completed, the second control portion 18 will request the first control portion 17 to update the second management table 16c in the second memory 16 (Step ST124).

When a request for renewing the second management table 16c is received from the second control portion 18, the first control portion 17 will update the physical address and the offset number OFT, both being kept in the second management table 16c (step ST125).

Here, restoration of the first management table 16b and the second management table 16c will be explained.

Restoration of the first management Table 16b and the second management Table 16c is an operation of reading from the first memory 12 and writing in the second memory 16 the first management Table 16b and the second management Table 16c when the first management Table 16b and the second management Table 16c do not exist in the second memory 16, such as at the time of starting the memory system 10, for instance.

What should be done to restore the first management table 16b is just reading from the first memory 12 namespace ID (NS_ID), region entry size, and the total number of regions. Therefore, it is not necessary to preserve second management table address in the first memory 12. It is because the maximum number of namespaces (the maximum number of namespace ID's) is generally determined for every memory system 10.

In this case, the second management table addresses may be calculated from, for example, the region entry size and the total number of regions at the time of restoring the first management table 16b, and may be reassigned in increasing order from the smallest value as namespace ID becomes larger.

The restoration of the second management table 16c is none other than reading physical addresses and offset numbers OFT from the first log area 12c of the memory 12. Accordingly, it is not necessary to preserve cache addresses in the first memory 12. It is because what is necessary is just to determine cache addresses when actually reading clusters as LUT data from the translation table storage area 12a of the first memory 12.

In addition, as has been explained with reference to FIG. 6, the length of an LUT log (a data row) in log area 12c of the first memory 12 is variable depending on the number of regions in a cluster.

Therefore, if regions are large, and one cluster comprises few regions, then an LUT log will have only a few entries. Accordingly, if regions are large, the time required for restoring the first management Table 16b and the second management Table 16c will be short.

FIG. 14 illustrates exemplary steps of changing the size of the regions.

This operation may be executed by a command from the host 11 or may be independently executed by the memory system 10 alone. Here, the former case will be explained.

The host 11 can request the memory system 10 to change the size of the regions. The host 11 can refer to the information (the maximum number of regions which the second memory 16 can store, the number of regions in use, or the number of remaining regions) obtained by the steps of FIG. 7, for example, and can change the size of the regions.

First of all, the host 11 issues a command which requests the memory system 10 to change the size of the regions (step ST141). Simultaneously with the issuance of the command, the host 11 presents the memory system 10 with some pieces of information, including namespace ID (NS_ID) which is a target of change in region size, a specific region size (a region size after change), etc.

The front end 14 receives the command which is sent from the host 11 and requests change of region size, and then transmits as information all that it receives to the first control portion 17 in the back end 15 (step ST142).

The first control portion 17 receives the request for change of region size. Then, it compares the specified region size and the existing region size (a region size before change).

The fact that the specified region size is larger than the existing region size means that the process of decreasing the number of regions should be performed. The first control portion 17 therefore determines that change of region size is possible in this case. The first control portion 17 changes the total number of regions in the first management table 16b based on the specified region size (step ST143).

Figure 15A:
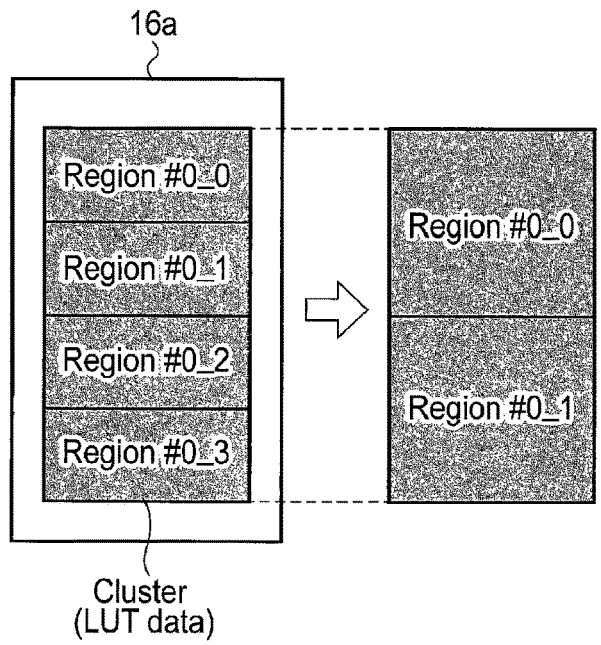
FIG. 15A and FIG. 15B are figures, each exemplarily illustrating a change of the region size.

For example, as illustrated in FIG. 15A, when a specified region size is twice the existing region size, two regions #0_0 and #0_1, each having the existing region size, are assigned to one region #0_0 having the specified region size, and two regions #0_2 and #0_3, each having the existing region size, are assigned to one region #0_1 having the specified region size.

At this moment, two regions #0_0 and #0_1, each having the specified region size, are put together to from one cluster (LUT data) and are collectively subjected to an update process illustrated in FIG. 12. The second management table 16c of FIG. 5 will be thus updated in physical addresses and offsets OFT.

After change of region size completes, the first control portion 17 transmits a notification of completion (success of change) to the front end 14 (step ST144). The front end 14 transmits the notification of completion (success of change) to the host 11 (step ST145).

When the specified region size is equal to the existing region size, any special process which the controller 15 must execute is unnecessary. Accordingly, the first control portion 17 immediately transmits a notification of completion (success of change) to the front end 14 (step ST144). The front end 14 transmits the notification of completion (success of change) to the host 11 (step ST145).

In contrast, the fact that the specified region size is smaller than the existing region size means that the process of increasing the number of regions should be performed. Accordingly, the first control portion 17 executes the following steps to determine whether change of region size is possible.

First of all, the total number of regions, each region having the specified region size, is calculated. The total number of regions, each region having the specified region size, is obtained by $n1=(n0 \times s0)/s1$. Here, $n0$ is the total number of regions, each region having the existing region size, $s0$ is the existing region size, $n1$ is the total number of regions, each region having the specified region size, and $s1$ is the specified region size.

Subsequently, the total number of regions, each region having the existing region size, is subtracted from the total number of the regions, each region having the specified region size. Then, the number of regions added to the namespace (additional regions) is obtained.

Subsequently, the number of additional regions is compared with the number of remaining regions.

The fact that the number of additional regions is the same as or less than the number of remaining regions means that it is possible to store in the second memory 16 regions each having the specified region size. Therefore, the first control portion 17 determines that change of region size is possible in this case. The first control portion 17 changes the total number of regions in the first management table 16b based on the specified region size (step ST143).

Figure 15B:
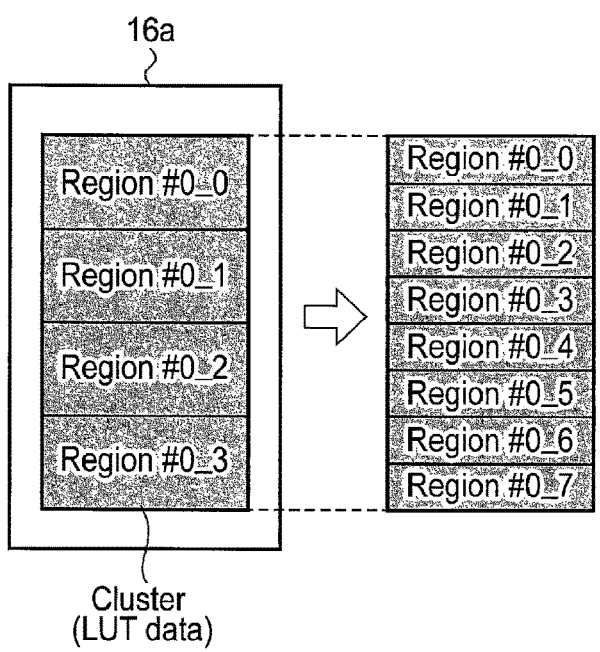

For example, as illustrated in FIG. 15B, when the specified region size is half as large as the existing region size, one region #0_0 having the existing region size is divided into two regions #0_0 and #0_1, each having the specified region size, one region #0_1 having the existing region size is divided into two regions #0_2 and #0_3, each having the specified region size, one region #0_2 having the existing region size is divided into two regions #0_4 and #0_5, each having the specified region size, and one region #0_3 having the existing region size is divided into two regions #0_6 and #0_7, each having the specified region size.

At this moment, eight regions #0_0, #0_1, #0_2, #0_3, #0_4, #0_5, #0_6, and #0_7, each having the specified region size, are put together to from one cluster (LUT data) and are collectively subjected to an update process illustrated in FIG. 12. The second management table 16c of FIG. 5 will be thus updated in physical addresses and offsets OFT.

After the change of region size has been completed, the first control portion 17 transmits a notification of completion (success of change) to the front end 14 (step ST144). The front end 14 transmits the notification of completion (success of change) to the host 11 (step ST145).

On the other hand, the fact that additional regions are larger in number than the remaining regions means that data in the regions, each of which has the specified region size, cannot be stored in the second memory 16. Therefore, the first control portion 17 determines that change of region size is impossible in this case.

When it is found that change of region size is impossible, the first control portion 17 transmits a notification of completion (failure of change) to the front end 14 (step ST144). The front end 14 transmits the notification of completion (failure of change) to the host 11 (step ST145).

In this connection it is possible for the first control portion 17 to perform a process of increasing the number of remaining regions before changing region size. Namely, before those namespaces that are specified by the respective specific namespace ID's are subjected to a process of changing region size, the existing namespaces specified by the respective remaining namespace ID's other than the specific namespace ID's are subjected to a process of enlarging region size. Then, the number of regions which each of the remaining namespaces can hold will decrease. This means that the total number of regions (regions in use) held in all the remaining namespaces will decrease. In other words, the number of remaining regions will increase.

Therefore, if a process of increasing the number of remaining regions is performed first and a process of changing region size is subsequently executed in accordance with the specified namespace ID's (NS_ID's), it will be possible to reduce failure to change region size. Therefore, a possibility of sending a notification of completion (failure of change) will be reduced.

It should be noted that, when a region size is changed, the host 11 specifies a region size in the embodiment. However, it is omissible that the host 11 specifies a region size.

When the host 11 does not specify any region size, or when the memory system 10 independently changes the size of the regions separately from the instructions from the host 11, the memory system 10 performs the same process as the case where a region size is not specified as illustrated in FIG. 8. That is, the first control portion 17 sets a suitable region size, and changes the region size of a specified namespace ID (NS_ID) based on the set region size.

FIG. 16 illustrates an embodiment in which a region size adjustment is executed by middleware.

The host 11 may have what is called middleware 20 that changes the region size of namespaces based on the tendency of read-and-write operation of user data. That is, when it will be necessary to change one namespace in respect of region size, the middleware 20 will issue to the memory system 10 a command which changes of the region size of the namespace.

For example, the user previously installs in middleware 20 the tendency of read-and-write operation of an application. Based on it, the middleware 20 changes the region size of the namespace in which the application is stored.

Moreover, the middleware 20 monitors the access pattern for every namespace in real time, reduces the region size of a namespace to which comparatively many writes are performed, and enlarges the region size of a namespace to which comparatively few writes are performed.

Accordingly, the WAF of the LUT (translation table) of the whole logical drive in the memory system 10 can be reduced, and the life of the first memory 12 can be prolonged.

(Conclusion)

As has been explained above, a namespace in which reading and writing are frequently performed is made to be reduced in region size in the embodiment. This suppresses that the WAF becomes large. Moreover, a namespace in which reading is almost always performed whereas writing is rarely performed is made to be enlarged in region size. Then, the WAF will not be large and the size of a management table which manages a translation table will be reduced. Moreover, enlarging a region size achieves a quick reload of the first and second management tables, each of which manages the translation table.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A memory system is connectable to a host, the memory system comprising:
   a first memory as a nonvolatile memory storing information regarding an address translation between a logical address and a physical address;
   a second memory temporarily storing a first part and a second part of the information;
   a controller circuitry configured to:
   execute a read operation and a write operation of the first part of the information from and to the second memory in a first unit,
   be able to change a size of the first unit, the size of the first unit being a size of one of regions obtained by dividing in a first logical address space of the memory system, the size of each of the regions being equal to each other in the first logical address space,
   execute a read operation and a write operation of the second part of the information from and to the second memory in a second unit, the second unit being different from the first unit, and be able to change a size of the second unit, the size of the second unit being a size of one of regions obtained by dividing a second logical address space of the memory system, the second logical address space being different from the first logical address space.

2. The memory system of claim 1, wherein the controller circuitry stores a first management table and a second management table into the second memory, the first management table being for managing the first logical address space, the second management table being for managing a relationship in the first logical address space between the regions in the first memory and the regions in the second memory.

3. The memory system of claim 2, wherein the first management table manages an address specifying the second management table, and manages a size and a count of the regions in the first logical address space.

4. The memory system of claim 3, wherein the controller circuitry changes the count of the regions in the first logical address space into zero in the first management table and deletes the second management table associated with the first logical address space, when deleting the first logical address space.

5. The memory system of claim 3, wherein the controller circuitry calculates an available count of regions that can be assigned to a new logical address space based on a maximal count of regions storable in the second memory and a total count of assigned regions managed in the first management table.

6. The memory system of claim 5, wherein the controller circuitry shows at least one of the maximal count of regions storable, the total count of the assigned regions, and the available count of regions to the host based on a command from the host.

7. The memory system of claim 2, wherein the second management table manages an addresses in the first memory and an addresses in the second memory for a region in the first logical address space.

8. The memory system of claim 7, wherein the controller circuitry executes a write operation of the information to the first memory in a third unit, the size of the third unit is a natural number times of the size of the first unit, and the second management table has information to locate a part of the information of the first unit out of a part of the information of the third unit.

9. The memory system of claim 2, wherein the controller circuitry:
divides the first logical address space into regions with a fourth unit, the fourth unit being different from the first unit, and
changes a divisor of the first logical address space from the first unit to the fourth unit when the second management table for the regions with the fourth unit is storable into the second memory.

10. The memory system of claim 9, wherein the controller circuitry changes the divisor of the first logical address space from the first unit to the fourth unit based on a command from the host.

11. The memory system of claim 2, wherein the controller circuitry further stores a third management table into the second memory, the third management table being for managing a relationship in the second logical address space between the regions in the first memory and the regions in the second memory; and the first management table is used for further managing the second logical address space.

12. The memory system of claim 11, wherein the controller circuitry adds the second logical address space based on a command from the host.

13. The memory system of claim 12, wherein the controller circuitry uses a predetermined data unit as the second unit when the command does not specify the second unit.

14. The memory system of claim 12, wherein the controller circuitry determines that the second logical address space cannot be added, when the third management table for the regions with the second unit is not storable in the second memory and the second unit cannot be enlarged any more.

15. The memory system of claim 11, wherein the controller circuitry:
divides the second logical address space into regions with a fifth unit larger than the second unit when the third management table for the regions of the second unit is not storable into the second memory, and
manages the second logical address space using the first management table when the third management table for the regions with the fifth unit is storable into the second memory.

16. The memory system of claim 1, wherein the size of the first unit is changeable such that a count of the regions in the first logical address space is within a range equal to or smaller than a maximal count of regions storable in the second memory.

17. The memory system of claim 1, wherein the controller circuitry stores parts of the information of the regions with different sizes into the second memory.

18. The memory system of claim 17, wherein the controller circuitry:
executes a write operation of the information to the first memory in a third unit, the third unit being different from the first unit,
collects the regions with a same data size from the second memory,
generates a part of the information with the third unit including the regions with the same size, and
stores the part of the information of the regions with the same size into the first memory in third unit.

19. The memory system of claim 1, wherein the host instructs to change the size of the first unit to the controller circuitry based on a tendency of write operations of user data.

* * * * *